United States Patent
Kuo et al.

(10) Patent No.: US 12,518,377 B2
(45) Date of Patent: Jan. 6, 2026

(54) MAPPING BETWEEN COMPUTED TOMOGRAPHY AND ANGIOGRAPHY FOR CO-REGISTRATION OF INTRAVASCULAR DATA AND BLOOD VESSEL METRICS WITH COMPUTED TOMOGRAPHY-BASED THREE-DIMENSIONAL MODEL

(71) Applicant: PHILIPS IMAGE GUIDED THERAPY CORPORATION, San Diego, CA (US)

(72) Inventors: Yannick Marama Kuo, San Diego, CA (US); Fergus Merritt, Gold River, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 276 days.

(21) Appl. No.: 18/028,827

(22) PCT Filed: Sep. 22, 2021

(86) PCT No.: PCT/EP2021/075993
§ 371 (c)(1),
(2) Date: Mar. 28, 2023

(87) PCT Pub. No.: WO2022/069303
PCT Pub. Date: Apr. 7, 2022

(65) Prior Publication Data
US 2023/0334659 A1    Oct. 19, 2023

Related U.S. Application Data

(60) Provisional application No. 63/084,612, filed on Sep. 29, 2020.

(51) Int. Cl.
*G06T 7/00* (2017.01)
*A61B 6/50* (2024.01)
(Continued)

(52) U.S. Cl.
CPC ............ *G06T 7/0012* (2013.01); *A61B 6/504* (2013.01); *G06T 7/30* (2017.01); *G06T 17/00* (2013.01);
(Continued)

(58) Field of Classification Search
CPC ......... G06T 7/0012; G06T 7/30; G06T 17/00; G06T 2207/10081; G06T 2207/10121;
(Continued)

(56) References Cited

U.S. PATENT DOCUMENTS 6,370,421 B1 *  4/2002  Williams ................. A61B 6/12
                                                    604/528
6,501,848 B1    12/2002  Carroll
(Continued)

FOREIGN PATENT DOCUMENTS

WO    WO-2014106186 A1 *  7/2014  ........... A61B 5/0066

OTHER PUBLICATIONS

International Search Report and Written Opinion of PCT/EP2021/075993, dated Apr. 4, 2022.
(Continued)

*Primary Examiner* — Utpal D Shah
(74) *Attorney, Agent, or Firm* — Larry Liberchuk

(57) ABSTRACT

A co-registration system includes a processor circuit that determines a mapping between corresponding locations of a first 3D model of a blood vessel based on CT imaging data and a second 3D model of the blood vessel based on x-ray angiography data. The processor circuit receives, from an x-ray fluoroscopy device, x-ray fluoroscopy images of the blood vessel while an intravascular catheter/guidewire moves through the blood vessel. The processor circuit receives, from the catheter/guidewire, intravascular data representative of the blood vessel while the catheter/guidewire moves through the blood vessel. The processor
(Continued)

circuit co-registers the intravascular data to the second 3D model based on the x-ray fluoroscopy images. The processor circuit co-registers the intravascular data to the first 3D model based on the mapping. The processor circuit outputs, to a display, the first 3D model and a visual representation of the intravascular data overlaid on the first 3D model.

20 Claims, 23 Drawing Sheets

(51) Int. Cl.
*G06T 7/30* (2017.01)
*G06T 17/00* (2006.01)

(52) U.S. Cl.
CPC .............. *G06T 2207/10081* (2013.01); *G06T 2207/10121* (2013.01); *G06T 2207/30021* (2013.01); *G06T 2207/30104* (2013.01)

(58) Field of Classification Search
CPC . G06T 2207/30021; G06T 2207/30104; A61B 6/504
See application file for complete search history.

(56) References Cited

U.S. PATENT DOCUMENTS

| | | | |
|---|---|---|---|
| 7,930,014 | B2 | 4/2011 | Huennekens |
| 8,290,228 | B2 | 10/2012 | Cohen |
| 8,463,007 | B2 | 6/2013 | Steinberg |
| 8,670,603 | B2 | 3/2014 | Tolkowsky |
| 8,693,756 | B2 | 4/2014 | Tolkowsky |
| 8,791,193 | B2 | 7/2014 | Steinberg |
| 8,855,744 | B2 | 10/2014 | Tolkowsky |
| 10,076,301 | B2 * | 9/2018 | Millett ................. A61B 8/12 |
| 2008/0281418 | A1 | 11/2008 | Firestone |
| 2009/0281418 | A1 * | 11/2009 | Ruijters ............. A61B 6/5247 |
| | | | 382/294 |
| 2014/0254900 | A1 * | 9/2014 | Sturm .................. A61B 5/489 |
| | | | 382/128 |

OTHER PUBLICATIONS

Chen, S.J. et al "3-D Reconstruction of Conorary Arterial Tree to Optimize Angiographic Visualization", IEEE Transactions on Medical Imaging, vol. 19, No. 4, pp. 318-336, Apr. 2000.

* cited by examiner

MAPPING BETWEEN COMPUTED TOMOGRAPHY AND ANGIOGRAPHY FOR CO-REGISTRATION OF INTRAVASCULAR DATA AND BLOOD VESSEL METRICS WITH COMPUTED TOMOGRAPHY-BASED THREE-DIMENSIONAL MODEL

TECHNICAL FIELD

The present disclosure relates generally to co-registering data from different medical diagnostic modalities. In particular, intravascular data and angiography-based data may be co-registered to a three-dimensional computed tomography-based model by projecting the data to a three-dimensional angiography-based model and establishing a mapping between positions on the computed tomography-based model and the angiography-based model.

BACKGROUND

Physicians use many different medical diagnostic systems and tools to monitor a patient's health and diagnose medical conditions. Different modalities of medical diagnostic systems may provide a physician with different images, models, and/or data relating to internal structures within a patient. These modalities include invasive devices and systems, such as intravascular systems, and non-invasive devices and systems, such as x-ray systems, and computed tomography (CT) systems. Using multiple diagnostic systems to examine a patient's anatomy provides a physician with added insight into the condition of the patient.

In the field of intravascular imaging and physiology measurement, co-registration of data from invasive devices (e.g. intravascular ultrasound (IVUS) devices or instantaneous wave-free ratio (iFR) devices) with images collected non-invasively (e.g. via x-ray angiography) is a powerful technique for improving the efficiency and accuracy of vascular catheterization procedures. Co-registration identifies the locations of intravascular data measurements along a blood vessel by mapping the data to an angiography image of the vessel. A physician may then know exactly where in the vessel a measurement was made, rather than estimate the location.

Currently, no method of co-registering intravascular data with a three-dimensional CT model is commercially available. There is also currently no method of co-registering data from an x-ray angiography image (e.g. QCA) with a three-dimensional CT model. If a physician obtains intravascular data or x-ray angiography data of a patient's anatomy as well as a three-dimensional CT model, the physician must estimate the locations of intravascular and angiography data within the CT model, which may lead to decreased accuracy in treatment recommendations or procedures.

SUMMARY

Embodiments of the present disclosure are systems, devices, and methods for co-registering intravascular data and angiography data to a three-dimensional CT-based model. This advantageously provides guidance to the physician concerning locations of features of interest, such as occlusions, within a blood vessel. It also provides exact locations of measurements, such as vessel diameter, blood pressure, and blood flow, in a three-dimensional CT-based model giving the physician more accurate and more detailed views of a patient's anatomy. A system configured to perform the co-registration may include an intravascular device, an x-ray imaging device, and a CT device, all in communication with a co-registration system.

The co-registration system receives CT imaging data which is used to construct a three-dimensional model of a patient's vasculature. The system also receives two or more x-ray angiography images of the patient's vasculature obtained at two different angles. The x-ray angiography images are then used to create an additional three-dimensional model of the vasculature. The system then identifies common landmark features in both the x-ray angiography-based model and the CT-based model to create a mapping between the two models.

In one aspect, the system may receive multiple x-ray fluoroscopy images of the patient's vasculature at any angle while an intravascular device moves through the vasculature collecting data. The intravascular data is mapped to the fluoroscopy images associating the intravascular data with locations along a two-dimensional path. The two-dimensional path and its associated intravascular data is projected onto the three-dimensional angiography-based model and then mapped to the CT-based model. The intravascular data may then be displayed along the corresponding vessel in the three-dimensional CT-based model.

In another aspect, the system may receive an angiography image at any angle and calculate angiography-based data using the image (e.g. QCA data). The angiography-based data from the two-dimensional angiography image may similarly be projected onto the three-dimensional angiography-based model and mapped to the CT-based model. The angiography data may then be displayed along the corresponding vessels in the three-dimensional CT-based model.

In an exemplary aspect of the present disclosure, a co-registration system is provided. The co-registration system includes a processor circuit configured for communication with a display, an x-ray fluoroscopy device, and an intravascular catheter or guidewire, wherein the processor circuit is configured to: determine a mapping between corresponding locations of a first three-dimensional (3D) model of a blood vessel based on computed tomography (CT) imaging data and a second 3D model of the blood vessel based on x-ray angiography data; receive, from the x-ray fluoroscopy device, a plurality of x-ray fluoroscopy images of the blood vessel while the intravascular catheter or guidewire moves through the blood vessel; receive, from the intravascular catheter or guidewire, intravascular data representative of the blood vessel while the intravascular catheter or guidewire moves through the blood vessel; co-register the intravascular data to the second 3D model based on the plurality of x-ray fluoroscopy images; co-register the intravascular data to the first 3D model based on the mapping; and output, to the display, the first 3D model and a visual representation of the intravascular data overlaid on the first 3D model.

In some aspects, the processor circuit is configured to associate same anatomical features of the blood vessel in the first 3D model and the second 3D model to determine the mapping. In some aspects, the plurality of x-ray fluoroscopy images comprise two-dimensional (2D) images, and the processor circuit is configured to use a matrix transformation to project locations of the intravascular data from the 2D images to the second 3D model to co-register the intravascular data to the second 3D model. In some aspects, the processor circuit is configured to use an angle at which the plurality of x-ray fluoroscopy images were obtained to project the locations of the intravascular data from the 2D images to the second 3D model with the matrix transformation. In some aspects, the processor circuit is configured to:

receive the CT imaging data from a CT imaging device in communication with the processor circuit; and generate the first 3D model of the vessel based on the CT imaging data. In some aspects, the system further includes a CT imaging device. In some aspects, the processor circuit is configured to: receive the x-ray angiography data from a x-ray angiography device in communication with the processor circuit, wherein the x-ray angiography data comprises a first x-ray angiography image of the blood vessel and the second x-ray angiography image of the blood vessel, wherein the first x-ray angiography image and the second x-ray angiography image are obtained at different angles; and generate the second 3D model based on the x-ray angiography data. In some aspects, the system further includes the x-ray angiography device. In some aspects, the processor circuit is configured to output, to the display, a visualization of the intravascular data associated with a location of the visual representation along the blood vessel in the roadmap. In some aspects, the intravascular data comprises at least one of pressure data, flow data, or imaging data. In some aspects, the system further includes the intravascular catheter or guidewire. In some aspects, the system further includes the x-ray fluoroscopy device.

In an exemplary aspect of the present disclosure, a co-registration system is provided. The co-registration system includes a processor circuit configured for communication with a display and an x-ray angiography device, wherein the processor circuit is configured to: determine a mapping between corresponding locations of a first three-dimensional (3D) model of a blood vessel based on computed tomography (CT) imaging data and a second 3D model of the blood vessel based on x-ray angiography data; receive, from the x-ray angiography device, a first x-ray angiography image of the blood vessel; determine a metric representative of the blood vessel based on the first x-ray angiography image; co-register the metric to the second 3D model based on the first x-ray angiography image; co-register the metric to the first 3D model based on the mapping; and output, to the display, the first 3D model and a visual representation of the metric overlaid on the first 3D model.

In some aspects, the processor circuit is configured to associate same anatomical features of the blood vessel in the first 3D model and the second 3D model to determine the mapping. In some aspects, the first x-ray angiography image comprises a two-dimensional (2D) image, and the processor circuit is configured to use a matrix transformation to project a location of the metric from the 2D image to the second 3D model to co-register the metric to the second 3D model. In some aspects, the processor circuit is configured to use an angle at which the first x-ray angiography image was obtained to project the location of the metric from the 2D image to the second 3D model with the matrix transformation. In some aspects, the processor circuit is configured to: receive the CT imaging data from a CT imaging device in communication with the processor circuit; and generate the first 3D model of the vessel based on the CT imaging data. In some aspects, the system further includes a CT imaging device. In some aspects, the processor circuit is configured to: receive the x-ray angiography data from the x-ray angiography device in communication with the processor circuit, wherein the x-ray angiography data comprises a second x-ray angiography image of the blood vessel and a third x-ray angiography image of the blood vessel, wherein the second x-ray angiography image and the third x-ray angiography image are obtained at different angles; and generate the second 3D model based on the x-ray angiography data. In some aspects, the system further includes the x-ray angiography device.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
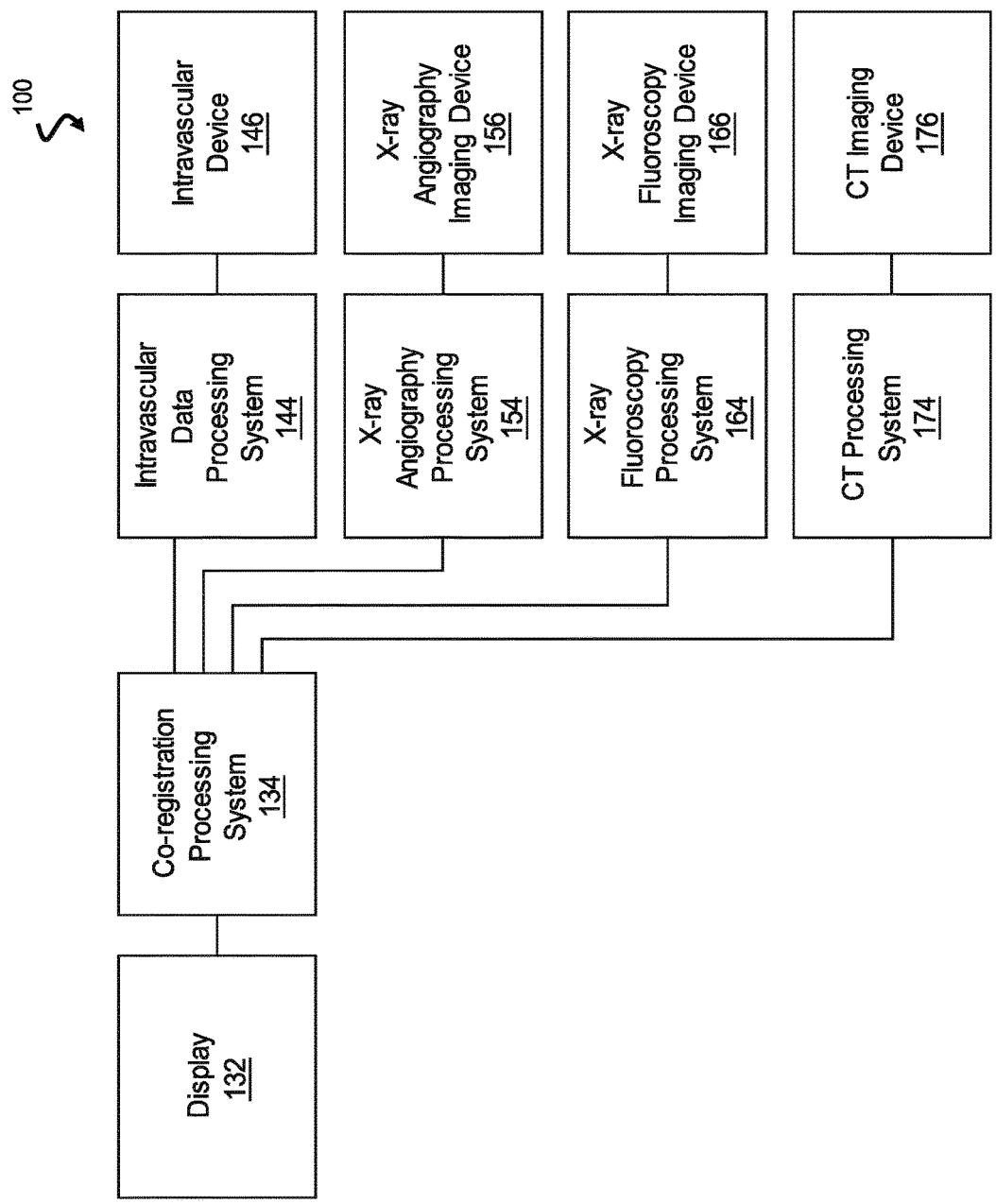
FIG. 1 is a schematic diagram of a medical diagnostic system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic diagram of a medical diagnostic system 100, according to aspects of the present disclosure. The diagnostic system 100 may include an intravascular device 146 in communication with an intravascular data processing system 144, an x-ray angiography imaging device 156 in communication with an x-ray angiography processing system 154, an x-ray fluoroscopy imaging device 166 in communication with an x-ray fluoroscopy processing system 164, and a computed tomography (CT) imaging device 176 in communication with a CT processing system 174. In addition, the diagnostic system 100 may include a co-registration processing system 134 in communication with the intravascular data processing system 144, the x-ray angiography processing system 154, the x-ray fluoroscopy processing system 164, and the CT processing system 174. The co-registration processing system 134 may additionally be in communication with a display 132 as well as any other suitable components, processors, systems, or devices. The diagnostic system 100 may be used for many different medical procedures, such as but not limited to diagnostic procedures, planning treatment, guiding treatment (e.g., during deployment of a treatment device), and evaluating the efficacy of treatment after it has been performed.

The co-registration processing system 134 shown in FIG. 1 may include any suitable hardware components, software components, or combinations of hardware and software components. For example, the processing system 134 may include any suitable circuitry, communication interfaces, processors, or processor circuits, among other components.

In some embodiments, the processing system 134 may include one or more processor circuits substantially similar to the processor circuit 510 described with reference to FIG. 5. Any of the systems 144, 154, 164, and/or 174 may also include one or more processor circuits substantially similar to the processor circuit 510 described with reference to FIG. 5. Any of the systems 144, 154, 164, and/or 174 may also include similar features, components, hardware components, software components, or combinations thereof as that of the co-registration processing system 134 described.

The intravascular data processing system 144 may be configured to receive intravascular data collected with the intravascular device 146. The intravascular data processing system 144 may receive intravascular data via a connecting cable and/or a communication interface as will be discussed in more detail with reference to FIG. 2. In some embodiments, the processing system 144 may process the received intravascular data to reconstruct an image of the tissue structures in the medium surrounding the intravascular device 146. In other embodiments, the system 144 may process received intravascular data to calculate metrics relating to the medium surrounding the device 146 such as but not limited to the diameter of a body lumen, fluid pressure or flow within a body lumen, or other physiological data or metrics. The system 144 may also perform any other suitable calculations or measurements depending on the type of device 146 and the type of data received. The intravascular data processing system 144 may be in communication with the display 132 or another display. The intravascular data processing system 144 may display images, visual representations (e.g., numerical/alphanumerical, graphical, symbolic, etc.), metrics, or other data relating to the body lumen imaged or measured via this display.

The x-ray angiography processing system 154 may be configured to receive angiography data collected with the x-ray angiography imaging device 156. The x-ray angiography processing system 154 may receive x-ray angiography data via a connecting cable and/or a communication interface. The angiography data can be used to generate angiographic images frames depicting the patient's anatomy. The angiography data obtained with the x-ray angiography imaging device 156 may correspond to an anatomy with a contrast agent introduced. The contrast agent may be used to enhance the visibility of internal fluids or structures within a patient's anatomy. In some embodiments, the contrast agent absorbs external x-rays from an x-ray source, resulting in decreased exposure on an x-ray detector in conjunction with the x-ray source. The contrast agent may be of any suitable material, chemical, or compound and may be a liquid, powder, paste, tablet, or of any other suitable form. For example, the contrast agent may include iodine-based compounds, barium sulfate compounds, gadolinium-based compounds, or any other suitable compounds. The contrast agent may additionally be referred to as a radiocontrast agent, a contrast dye, a radiocontrast dye, a contrast material, a radiocontrast material, a contrast media, or a radiocontrast media, among other terms.

In some embodiments, the processing system 154 may process the received angiography data to reconstruct an image of the patient anatomy and/or calculate metrics relating to the anatomy based on the angiography data. In some applications, the x-ray angiography processing system 154 may determine metrics associated with the patient anatomy using various image processing techniques or machine learning techniques as will be discussed in more detail hereafter with reference to FIG. 16. The x-ray angiography processing system 154 may be in communication with the display 132 or another display. The x-ray angiography processing system 154 may display images, visual representations (e.g., numerical/alphanumerical, graphical, symbolic, etc.), metrics, or data to a user of the imaging system 100 via this display.

The x-ray fluoroscopy processing system 164 may be configured to receive fluoroscopy data collected with the x-ray fluoroscopy imaging device 166. In some embodiments, the x-ray fluoroscopy processing system 164 may be the same system as the x-ray angiography system 154 and the x-ray fluoroscopy imaging device 166 may be the same device as the x-ray angiography imaging device 164. However, the fluoroscopy imaging device 166 may obtain x-ray images of an anatomy without a contrast agent introduced to a patient's vasculature. In other embodiments, the x-ray fluoroscopy processing system 164 and the x-ray angiography processing system 154 are separate systems and the x-ray fluoroscopy imaging device 166 and the x-ray angiography imaging device 156 are separate devices. In either embodiment, the x-ray fluoroscopy processing system 164 may include any or all of the same features or characteristics of the x-ray angiography processing system 154 and the x-ray fluoroscopy imaging device 166 may include any or all of the same features or characteristics of the x-ray angiography imaging device 156. The fluoroscopy data can be used to generate fluoroscopic images frame depicting the patient's anatomy. In some instances, the fluoroscopic image frames can collectively form a video sequence of x-ray images.

The CT processing system 174 may be configured to receive CT data collected with the CT imaging device 176. The CT processing system 174 may receive CT data via a connecting cable and/or a communication interface. The CT data obtained with the CT imaging device 176 may correspond to an anatomy with contrast agent introduced or without contrast agent introduced. The contrast agent introduced to a patient's anatomy during a CT imaging procedure may be substantially similar to the contrast agent previously described in relation to the x-ray angiography imaging device 156 and processing system 154. In some embodiments, the processing system 174 may process the received CT data to reconstruct an image of the patient's anatomy or may reconstruct a three-dimensional model of the anatomy. In some applications, the CT processing system 174 may additionally determine metrics associated with the patient's anatomy using various image processing techniques or machine learning techniques. The CT processing system 174 may be in communication with the display 132 or another display. The CT processing system 174 may display images, 3D models, visual representations (e.g., numerical/alphanumerical, graphical, symbolic, etc.), metrics, or data to a user via this display.

In some embodiments, the systems 134, 144, 154, 164, and/or 174 may each be a part of a combined system 100. For example, in some embodiments, the processing systems 134, 144, 154, 164, and/or 174 may be positioned within the same enclosure or housing. In addition, the processing systems 134, 144, 154, 164, and/or 174 may share one or more software or hardware components. In other embodiments, the processing systems 134, 144, 154, 164, and/or 174 may be separate systems but may be in communication with one another. The processing systems may be in continuous communication with one another or may be in intermittent communication with one another. The processing systems may be in communication with one another or with the devices 145, 156, 166, 176, and/or the display 132 via one or more wired connecting cables including any suitable conductors, such as single conductors, twisted pairs, universal serial bus (USB) cables, or any other suitable connecting cables. The processing systems 134, 144, 154, 164, and/or 174 may additionally or alternatively be in communication or with the devices 145, 156, 166, 176, and/or the display 132 via a wireless connection, an optical connection, or may be in connection via any suitable type of movable memory or storage media, or via any other suitable means of communication. In some embodiments, the co-registration processing system 134 may receive data, including raw data and/or processed data, images, models, visual representations (e.g., numerical/alphanumerical, graphical, symbolic, etc.), metrics, or any other information from any of the processing systems 144, 154, 164, and/or 174. The co-registration processing system 134 may receive such data from the other processing systems 144, 154, 164, and/or 174 simultaneously or separately. Any and/or all of the processing systems 134, 144, 154, 164, and/or 174 may include or be a part of any suitable system or device such as, but not limited to, a mobile console, a desktop computer, laptop computer, tablet, smartphone, or any other suitable computing device.

It is understood that aspects of the present disclosure may include any combination of extraluminal or extravascular imaging modalities such with x-ray angiography, x-ray fluoroscopy, computed tomography (CT), magnetic resonance imaging (MRI), ultrasound, etc. For example, the CT processing system 174 and the CT imaging device 176 may be an MRI processing system and MRI imaging device, or an ultrasound processing system and an ultrasound imaging device. In that regard, extraluminal or extravascular imaging be any suitable modality or modalities that can be used to generate 3D paths of anatomy (e.g., coronary vasculature).

Figure 2:
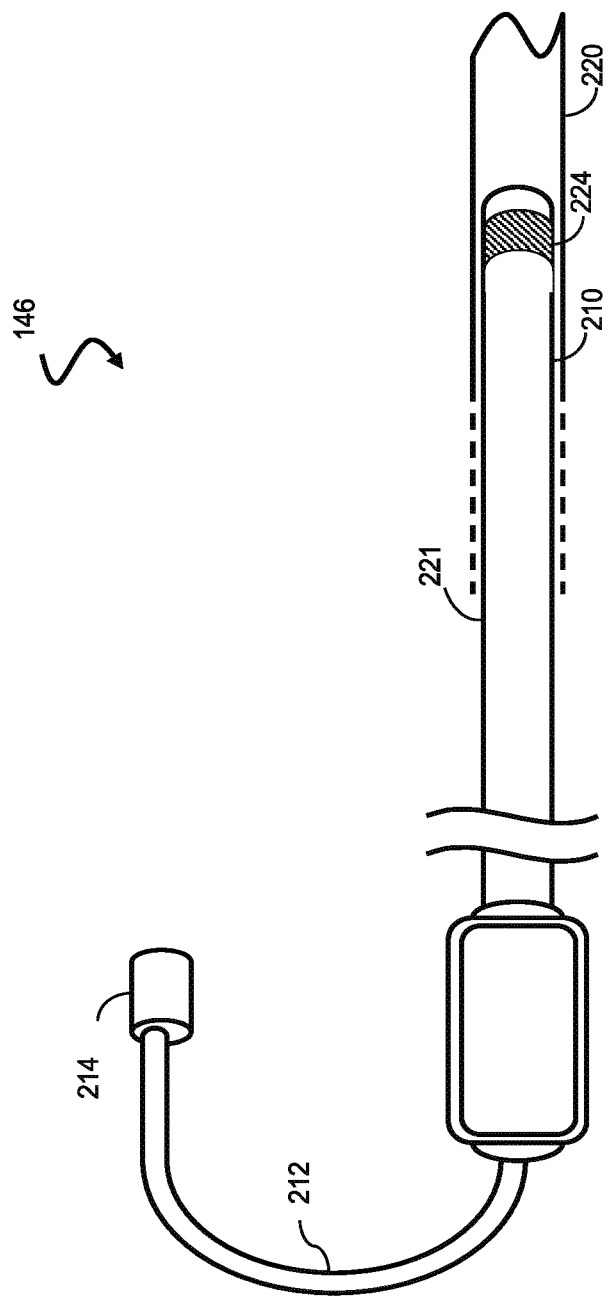
FIG. 2 is a diagrammatic view of an intravascular device, according to aspects of the present disclosure.

FIG. 2 is a diagrammatic view of an intravascular device 146, according to aspects of the present disclosure. The intravascular device 146 may be any type of invasive intravascular device used to acquire data from within the body of a patient. For example, the intravascular device 146 could be a catheter, a guide wire, or a guide catheter. In general, the device 146 can be an intraluminal device that obtains data from within any suitable lumen, chamber, or anatomy within the patient's body. An intraluminal device can also be referred to as an intra-body probe or an endocavity probe. The device 146 can be a sensing device that obtains information about the patient's body while positioned inside the patient's body. In some instances, the device 146 is an imaging device, such as an intravascular ultrasound (IVUS) device, including a rotational IVUS device or a solid-state IVUS device, an optical coherence tomography (OCT) device, an intravascular photoacoustic (IVPA) device, an intracardiac echocardiography device, or a transesophageal echocardiography (TEE) device. In some instances, the device 146 is a physiological-sensing device, such as a pressure-sensing device, a flow-sensing device, or a temperature-sensing device. The device 146 may include a flexible elongate member 221, a scanner assembly 210, a sensor 224, a transmission line bundle or cable 212, and a patient interface module (PIM) connector 214, among other components.

At a high level, the intravascular device 146 may acquire data relating to the region of anatomy surrounding the intravascular device 146. In that regard, the device 146 can be sized, shaped, or otherwise configured to be positioned within the body lumen 220 of a patient. In some embodiments, the system 100 can include a patient interface module (PIM) communicatively disposed between the intravascular device 146 and the intravascular data processing system 144 that receives and transfers the data obtained by the sensor 224 to the intravascular data processing system 144. The intravascular data processing system 144 can execute computer readable instructions stored on a non-transitory tangible computer readable medium.

The flexible elongate member 221 may be sized and shaped, structurally arranged, and/or otherwise configured to be positioned within a body lumen 220 of a patient. The flexible elongate member 221 may be a part of guidewire and/or a catheter (e.g., an inner member and/or an outer member). The flexible elongate member 221 may be constructed of any suitable flexible material. For example, the flexible elongate member 221 may be constructed of a polymer material including polyethylene, polypropylene, polystyrene, or other suitable materials that offer flexibility, resistance to corrosion, and lack of conductivity. In some embodiments, the flexible elongate member 221 may define a lumen for other components to pass through. The flexible elongate member 221 may be sufficiently flexible to successfully maneuver various turns or geometries within the vasculature of a patient. The flexible elongate member 221 may be of any suitable length or shape and may have any suitable characteristics or properties.

The sensor assembly 210 may be coupled to the flexible elongate member 221 and positioned at a distal portion or a distal end of the flexible elongate member 221. The sensor assembly 210 may house various circuitry, sensors, transducers, or any other suitable components used to acquire intravascular data. For example, the scanner assembly may include a support member, unibody, sensor housing, sensor mount, pressure sensor, flow sensor, temperature sensor, transducer array, control logic dies, various circuits, flexible substrates, various adhesives, or backing material, among other components. The sensor assembly 210 may provide structural support to components within the intravascular imaging device 146. The sensor assembly 210 may be constructed of any suitable material, including flexible or inflexible materials. The sensor assembly 210 may be of any suitable shape, including a tubular or circular shape, as well as any other geometric or non-geometric shape.

The sensor assembly 210 can acquire data relating to the lumen in which the device 146 is positioned. The scanner assembly 210 may acquire this data via any suitable number or type of sensors or other measurement tools. The data obtained by the intravascular device 146 and/or the sensor 224 data may be of any suitable form. In some embodiments, the sensor 224 is an ultrasound transducer or ultrasound transducer array. The sensor 224 can include one or more ultrasound transducer elements that emit ultrasonic energy and receive echoes that can be used to generate an ultrasound image (e.g., an IVUS image). In another embodiment, the sensor 224 is a pressure sensor that acquires pressure data at one or more locations along the body lumen of the patient as the device 146 moves through the body lumen. Pressure data can be used by the processing system 144 to calculate fractional flow reserve (FFR), instantaneous wave-free ratio (iFR), Pd/Pa, and/or any other suitable pressure ratio. In another embodiment, the sensor 224 is a flow sensor that obtains data related to velocity and/or volume of blood flow within a blood vessel. Flow data can be used by the processing system 144 to calculate coronary flow reserve (CFR), and/or any other suitable flow metric. For example, the flow sensor 224 can be a Doppler ultrasound transducer element. In another embodiment, the sensor 224 is a temperature sensor that obtains temperature data within the body lumen. In other embodiments, the sensor 224 may acquire OCT imaging data, IVPA imaging data, or any other suitable data.

The sensor 224 shown in FIG. 2 may be any suitable type of sensor depending on the specific application or type of intravascular device 146 including any of the components for intravascular data acquisition previously listed. In addition, the sensor 224 may represent more than one sensor. For example, in some embodiments, the sensor 224 may include multiple sensor devices including 2, 4, 6, 8, 16, 32, 64, 128, or more sensors, or any suitable number therebetween. In some embodiments, the sensor 224 may include a transducer array. The sensor 224 may additionally be a single rotating transducer. In some embodiments, the sensor 224 may be one or more pressure sensors and one or more flow sensors. The sensor 224, although positioned at a distal region of the scanner assembly 210 and the flexible elongate member 221, may be positioned at any suitable location on or within the sensor assembly 210 or the flexible elongate member 221.

The flexible elongate member 221 and/or the cable 212 include one, two, three, four, five, six, seven, or more conductors, optical fibers, or other signal communication lines. The signal communication lines are communicatively coupled to the connector 214 and the sensor 224. The signal communication lines carry electrical signals, optical signals, and/or any suitable type of signal from the sensor 224 to the processing system 144 (e.g., data obtained by the sensor 224) and/or from the processing system 114 to the sensor 224 (e.g., command/control signals). The cable 212 may facilitate communication between the intravascular device 146 and the intravascular data processing system 144 or any other control system or host system.

The cable 212 may be coupled to the patient interface module (PIM) connector 214 at a proximal portion or proximal end of the intravascular device 146. The PIM connector 214 may communicatively couple the signal communication lines to the PIM or other interface in communication with the intravascular data processing system 144. The PIM connector 214 may also physically couple the intravascular device 146 to the PIM.

In some embodiments, the intravascular device 146 and/or the PIM may perform preliminary processing of the intravascular data prior to relaying the data to the processing system. In examples of such embodiments, the intravascular device 146 and/or the PIM may perform amplification, filtering, and/or aggregating of the data. In an embodiment, the intravascular data processing system 144 and/or the PIM may also supply high- and low-voltage DC power to support operation of the device 146 including circuitry within the device.

Figure 3:
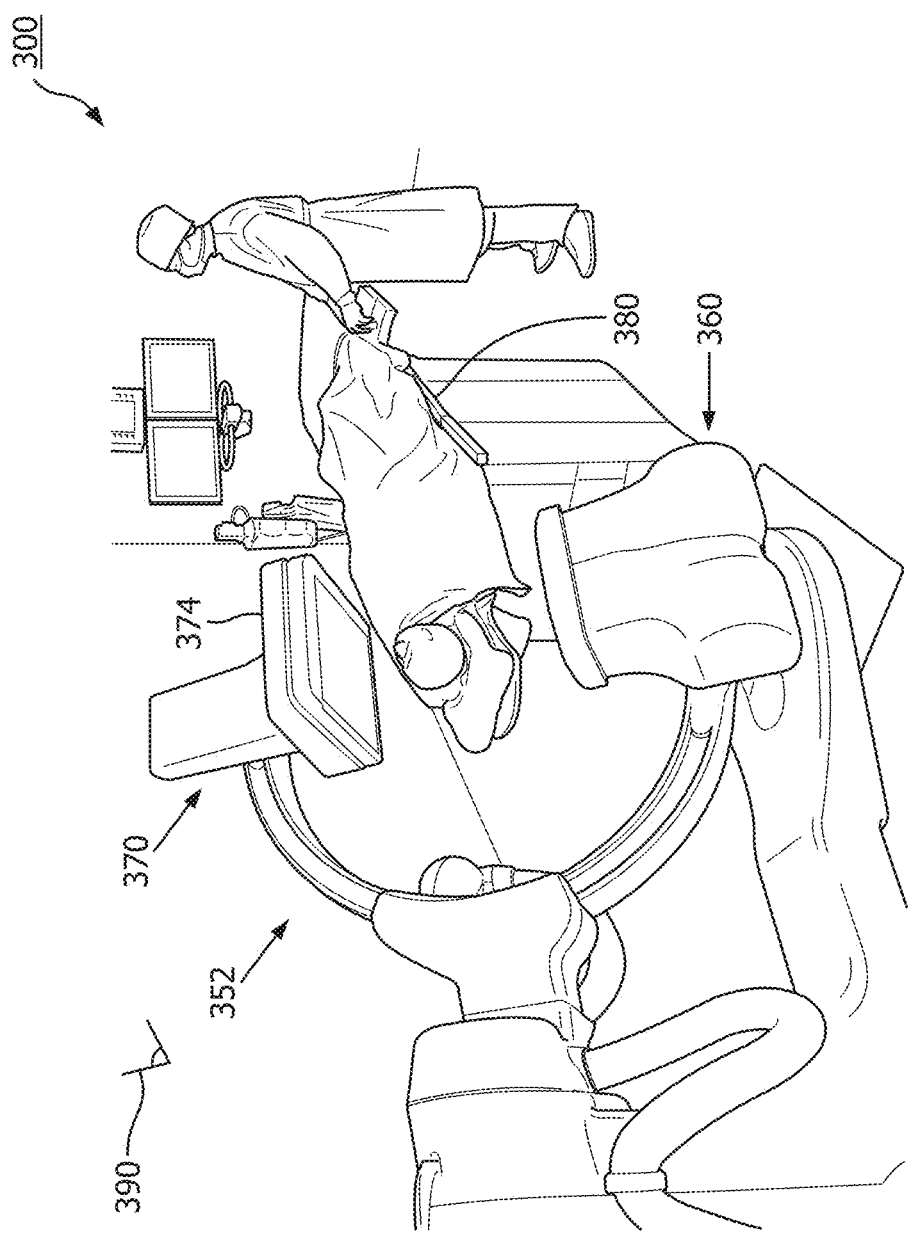
FIG. 3 is a diagrammatic view of an x-ray imaging device, according to aspects of the present disclosure.

FIG. 3 is a diagrammatic view of an x-ray imaging device, according to aspects of the present disclosure. The x-ray imaging device 300 may be the x-ray angiography imaging device 156 (FIG. 1) or may be the x-ray fluoroscopy imaging device 166 (FIG. 1) or may be a different device. In some embodiments, the x-ray imaging device 300 shown in FIG. 3, the x-ray angiography imaging device 156, and the x-ray fluoroscopy imaging device 166 may be the same device. The x-ray imaging device 300 may be of any suitable type, for example, it may be a stationary x-ray system such as a fixed c-arm x-ray device, a straight arm x-ray device, or a u-arm device. The x-ray imaging device 300 may additionally be any suitable mobile device such as a mobile c-arm x-ray device. The x-ray imaging device 300 may also be in communication with the x-ray angiography imaging processing system 154 and/or the x-ray fluoroscopy processing system 164. In some embodiments, the x-ray device 300 may include a digital radiography device or any other suitable device.

The x-ray imaging device 300 as shown in FIG. 3 includes an x-ray source 360, a detector 370 including an x-ray input screen 374. The x-ray source 360 and the input screen 374 may be mounted at a mutual distance and mounted on a movable arm 352. Positioned between the x-ray source 360 and the x-ray detector 370 may be an anatomy of a patient or object 380. The x-ray imaging device 300 may be used to image any suitable location or region of a patient's anatomy, including tissues, organs, malignancies, or any other structures or features. For example, the x-ray imaging device 300 may image without limitation the liver, heart, kidneys, gall bladder, pancreas, lungs; ducts; intestines; nervous system structures including the brain, dural sac, spinal cord and peripheral nerves; the urinary tract; as well as valves within the blood vessels, blood, chambers or other parts of the heart, abdominal organs, and/or other systems of the body. The imaging device 300 may additionally image tumors, cysts, lesions, hemorrhages, or blood pools, muscle, blood, blood plasma, interstitial fluid, lymph plasma, cerebrospinal fluid, intraocular fluid, serous fluid, synovial fluid, digestive fluid, urinary fluid, amniotic fluid, or any other type of suitable fluid, or any other region, structure, fluid, or gas within a patient anatomy.

The x-ray source 360 may include an x-ray tube adapted to generate x-rays. Some aspects of the x-ray source 360 may include one or more vacuum tubes including a cathode in connection with the negative lead of a high-voltage power source and an anode in connection with the positive lead of the same power source. The cathode of the x-ray source 360 may additionally include a filament. The filament may be of any suitable type or constructed of any suitable material, including tungsten or rhenium tungsten, and may be positioned within a recessed region of the cathode. One function of the cathode may be to expel electrons from the high voltage power source and focus them into a well-defined beam aimed at the anode. The anode may also be constructed of any suitable material and may be configured to create x-radiation from the emitted electrons of the cathode. In addition, the anode may dissipate heat created in the process of generating x-radiation. The anode may be shaped as a beveled disk and, in some embodiments, may be rotated via an electric motor. The cathode and anode of the x-ray source 360 may be housed in an airtight enclosure, sometimes referred to as an envelope.

In some embodiments, the x-ray source 360 may include a radiation object focus which influences the visibility of an image. The radiation object focus may be selected by a user of the system 100 or by a manufacturer of the system 100 based on characteristics such as blurring, visibility, heat-dissipating capacity, or other characteristics. In some embodiments, an operator or user of the system 100 may switch between different provided radiation object foci in a point-of-care setting.

The detector 370 may be configured to acquire x-ray images and may include the input screen 374. The input screen 374 may include one or more intensifying screens configured to absorb x-ray energy and convert the energy to light. The light may in turn expose a film. The input screen 374 may be used to convert x-ray energy to light in embodiments in which the film may be more sensitive to light than x-radiation. Different types of intensifying screens within the image intensifier may be selected depending on the region of a patient to be imaged, requirements for image detail and/or patient exposure, or any other factors. Intensifying screens may be constructed of any suitable materials, including barium lead sulfate, barium strontium sulfate, barium fluorochloride, yttrium oxysulfide, or any other suitable material. The input screen 374 may be a fluorescent screen or a film positioned directly adjacent to a fluorescent screen. In some embodiments, the input screen 374 may also include a protective screen to shield circuitry or components within the detector 370 from the surrounding environment. The x-ray detector 370 may additionally be referred to as an x-ray sensor.

The object 380 may be any suitable object to be imaged. In an exemplary embodiment, the object 380 may be the anatomy of a patient including any region of a patient's anatomy previously mentioned. More specifically, the anatomy to be imaged may include the coronary region. In some embodiments, the object 380 may include man-made structures.

In some embodiments, the x-ray source 360 and x-ray detector 370 are mounted to the movable arm 352. In this configuration, the x-ray source 360 and the x-ray detector 370 may be rotated around the object 380 or patient anatomy to acquire images of the object 380 or patient anatomy at different angles. The movable arm 352 may move the x-ray source 360 and detector 370 to any suitable location around the object 380 or patient anatomy. In some embodiments, the movable arm 352 may receive commands from the system 154 or 164 based on a user input to move the x-ray source 360 and detector 370 to a desired position or angle 390 with respect to the object 380 or patient anatomy to be imaged. The arm 352 may be of any suitable type or shape in addition to the one shown in FIG. 3 and may additionally be referred to as a gantry. In some embodiments, the x-ray imaging device 300 may include more than one set of x-ray sources 360 and detectors 370. For example, the x-ray imaging device 300 may be a bi-plane x-ray imaging system. In embodiments in which the x-ray imaging device 300 includes multiple sets of x-ray sources 360 and corresponding x-ray detectors 370, a physician may image the same regions of a patient's anatomy from multiple angles simultaneously or may image different regions of the patient's anatomy simultaneously.

As previously mentioned, the x-ray imaging device 300 may be configured to acquire angiography images. In such embodiments, a contrast agent may be introduced to a patient's anatomy before imaging. The contrast agent may be used to enhance the visibility of internal structures within a patient's anatomy. The contrast agent may absorb external x-rays, resulting in decreased exposure on the x-ray detector 370. The contrast agent may be of any suitable type previously listed. In other embodiments, in which fluoroscopy images are to be obtained, a contrast agent may not be introduced to the patient anatomy prior to imaging.

When an x-ray processing system, such as the x-ray angiography processing system 154 or the x-ray fluoroscopy processing system 164 of FIG. 1, is in communication with the x-ray imaging device 300, various data may be transmitted. This communication includes x-ray imaging data as well as control commands to the x-ray source 360 and/or x-ray detector 370 of the x-ray device 300. In some embodiments, the x-ray imaging device 300 may perform preliminary processing of the x-ray data prior to relaying the data to the processing system. In examples of such embodiments, the x-ray imaging device 300 may perform amplification, filtering, and/or aggregating of the data. In an embodiment, the x-ray image processing system may also supply high- and low-voltage DC power to support operation of the device 300 including circuitry within the device.

Figure 4:
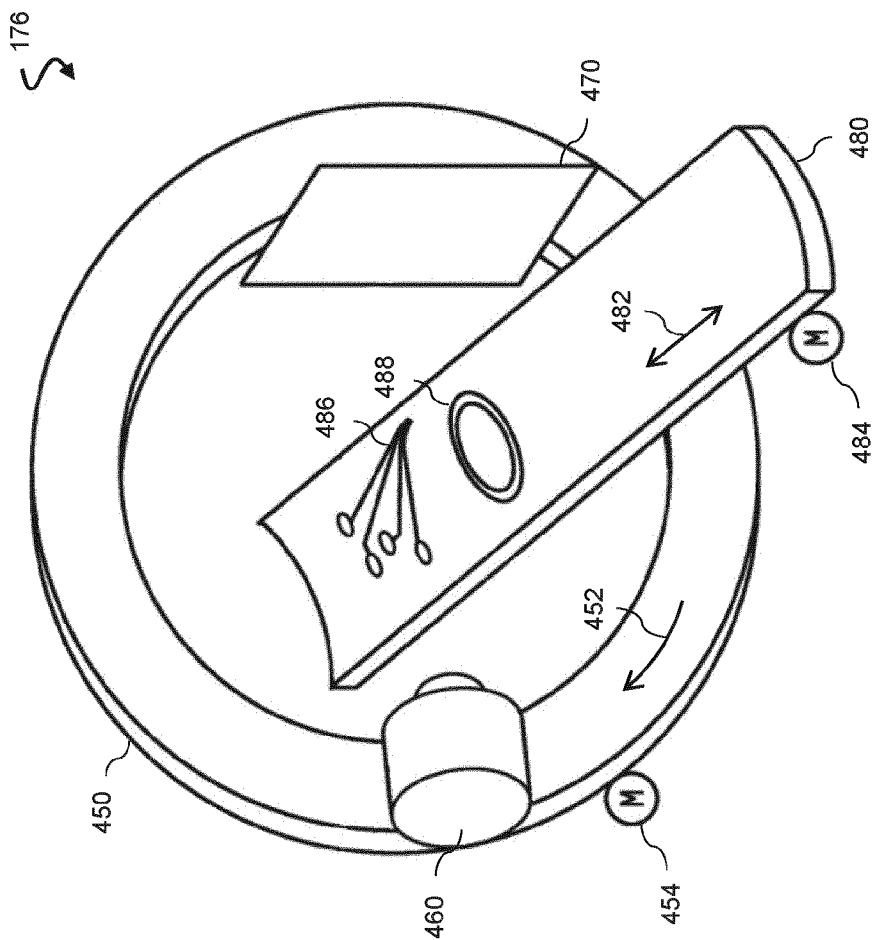
FIG. 4 is a diagrammatic view of a computed tomography (CT) imaging device, according to aspects of the present disclosure.

FIG. 4 is a diagrammatic view of a computed tomography (CT) imaging device 176, according to aspects of the present disclosure. The CT imaging device 176 may include an x-ray source 460, an x-ray detector 470, a CT gantry 450, a rotary drive 454, a patient support 480, a drive 484, a cardiac monitor 486, and a respiratory monitor 488, among other components. The CT imaging device 176 may be of any suitable form or type. For example, the CT imaging device 176 may be a spiral CT scanner, a single slice CT scanner, a multi-slice CT scanner, such as a 2, 4, 6, 8, 16, 32, 40, 64, or 128 slice CT scanner or greater slice numbers or a CT scanner of slice numbers therebetween. The CT imaging device 176 may also be a fixed or mobile device. The CT imaging device 176 may additionally have any suitable rotation time, slice width, or any other characteristics or features.

The x-ray source 460 may be substantially similar to the x-ray source 360 of FIG. 3 in that it may be configured to produce and project x-radiation. Specifically, the x-ray source 460 may include an x-ray tube and may include one or more vacuum tubes including a cathode and an anode in connection with a high-voltage power source. The cathode and anode of the x-ray source 460 may be configured to create x-radiation. The cathode and anode of the x-ray source 460 may be housed in an airtight enclosure and mounted to the CT gantry 450. The x-ray source 460 may also include a radiation object focus similar to the x-ray source 360.

The x-ray detector 470 may also be substantially similar to the x-ray detector 370 of FIG. 3. The detector 470 may be configured to acquire x-ray images and may include an input screen similar to the input screen 374 and/or one or more intensifying screens as previously described with reference to FIG. 3. Components within the x-ray detector 470 are configured to absorb x-ray energy and convert the energy to form an image. The x-ray detector 470 may include a fluorescent screen or a film positioned directly adjacent to a fluorescent screen.

The x-ray source 460 and the x-ray detector 470, along with various other components, may be mounted to the CT gantry 450 as shown in FIG. 4. The CT gantry 450 may be configured to rotate around a patient, an object, or the patient support 480 shown. The CT gantry 450 may rotate in a direction shown by arrow 452 or in another direction. As the CT gantry 450 rotates around a central region, the x-ray source 460 may emit x-radiation toward and/or through a patient anatomy. The x-ray detector 470 may be positioned opposed to and equidistant from the x-ray source 460 with relation to the patient anatomy to be imaged and may receive x-radiation emitted by the x-ray source 460. The CT imaging device 176 may be configured to image any suitable anatomical regions or locations, including any structures or features within a patient anatomy previously mentioned with regards to the x-ray imaging device 300. Because different structures within a patient anatomy absorb x-radiation differently, differences in absorption may be detected by the x-ray detector 470 and used to reconstruct an image of the anatomy. The x-ray source 460 and/or the x-ray detector 470 may be configured to obtain x-ray data at any suitable sample rate. X-ray data may be obtained from any suitable location or angle around the central region or patient support 480 and used to reconstruct an image of the patient anatomy.

The CT gantry 450 may rotate at any suitable rate. For example, the CT gantry may rotate at a rate of 60, 120, 200, 400 revolutions per minute (rpm) or more, or any suitable rate of rotation therebetween. In embodiments in which a heart is to be imaged, a greater rate of rotation may be used.

The CT gantry 450 may additionally include other components configured to produce, receive, or process x-radiation data or images. For example, the CT gantry 450 may include an inverter, a collimator, a cooling system of any suitable type, additional sensors or detectors, or a multiplier, among other components.

The CT gantry 450 may be coupled to the rotary drive 454. The rotary drive 454 may be configured to rotate the CT gantry 450 in the manner previously described. The rotary drive 454 may be in communication with the CT processing system 174 (FIG. 1) or another control system of any suitable type. For example, the rotary drive 454 may receive command signals from a control system. An operator of the CT imaging device 176 may select the rate of rotation of the CT gantry 450 and/or the sample rate of the x-ray source 460 and detector 470.

The patient support 480 may be positioned along a longitudinal axis 482 in relation to the CT gantry 450. The patient support 480 may be configured to support a patient to be imaged and move along the longitudinal axis or direction 482 so as to move the patient anatomy to be imaged through the CT gantry 450. The patient support 480 may be configured to move a specified distance corresponding to the region of the patient to be imaged. The drive 484 may be coupled to the patient support 480 and be configured to move the patient support the specified distance through the center of the CT gantry 450.

In some embodiments, the patient support 480 may include one or more patient monitors configured to monitor metrics or vital signs of the patient anatomy as the patient anatomy is imaged. For example, the cardiac monitor 486 may monitor and track the cardiac cycle of a patient. The cardiac monitor 486 may be of any suitable type, such as an electrocardiogramad system, or other type of monitor. In addition, the patient support 480 may include the respiratory monitor 488. The respiratory monitor 488 may be configured to monitor and track a patient's respiration state. Additional patient monitors may be included within the patient support 480.

Figure 5:
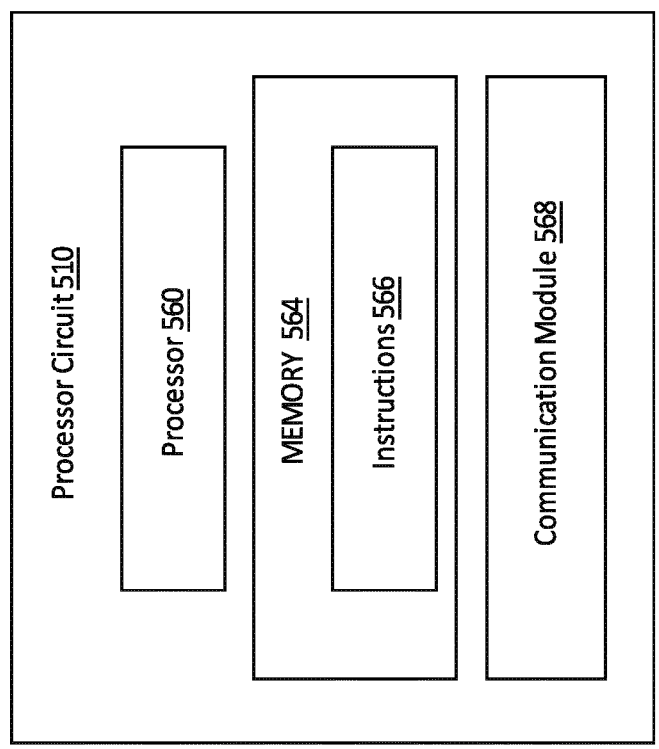
FIG. 5 is a schematic diagram of a processor circuit, according to aspects of the present disclosure.

FIG. 5 is a schematic diagram of a processor circuit 510, according to aspects of the present disclosure. The processor circuit 510 or a similar processor circuit may be implemented in any suitable device or system previously disclosed. One or more processor circuits 510 can be configured to perform the operations described herein. The processor circuit 510 can include additional circuitry or electronic components, such as those described herein. In an example, one or more processor circuits 510 may be in communication with transducer arrays, sensors, circuitry, or other components within the intravascular device 146 (FIGS. 1, 2), the x-ray source 360, the input screen 374, circuitry, or any other components within the x-ray imaging device 300 (FIG. 3) or angiography device 156 or fluoroscopy device 166 (FIG. 1). One or more processor circuits 510 may also be in communication with the x-ray source 460, the x-ray detector 470, circuitry, or any other components within the CT imaging device 176 (FIGS. 1, 4) and/or the display 132 (FIG. 1), as well as any other suitable component or circuit within the diagnostic system 100. As shown, the processor circuit 510 may include a processor 560, a memory 564, and a communication module 568. These elements may be in direct or indirect communication with each other, for example via one or more buses.

The processor 560 may include a CPU, a GPU, a DSP, an application-specific integrated circuit (ASIC), a controller, an field programmable gate array (FPGA), another hardware device, a firmware device, or any combination thereof configured to perform the operations described herein. The processor 560 may also be implemented as a combination of computing devices, e.g., a combination of a DSP and a microprocessor, a plurality of microprocessors, one or more microprocessors in conjunction with a DSP core, or any other such configuration.

The memory 564 may include a cache memory (e.g., a cache memory of the processor 560), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 564 includes a non-transitory computer-readable medium. The memory 564 may store instructions 566. The instructions 566 may include instructions that, when executed by the processor 560, cause the processor 560 to perform the operations described herein with reference to the devices 146, 156, 166, 300, 176, and/or the systems 134, 144, 154, 164, and/or 174. Instructions 566 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 510, the previously described devices and systems, and/or the display 132. In that regard, the communication module 568 can be an input/output (I/O) device. In some instances, the communication module 568 facilitates direct or indirect communication between various elements of the processor circuit 510 and/or the devices and systems of the diagnostic system 100 (FIGS. 1-4).

Figure 6:
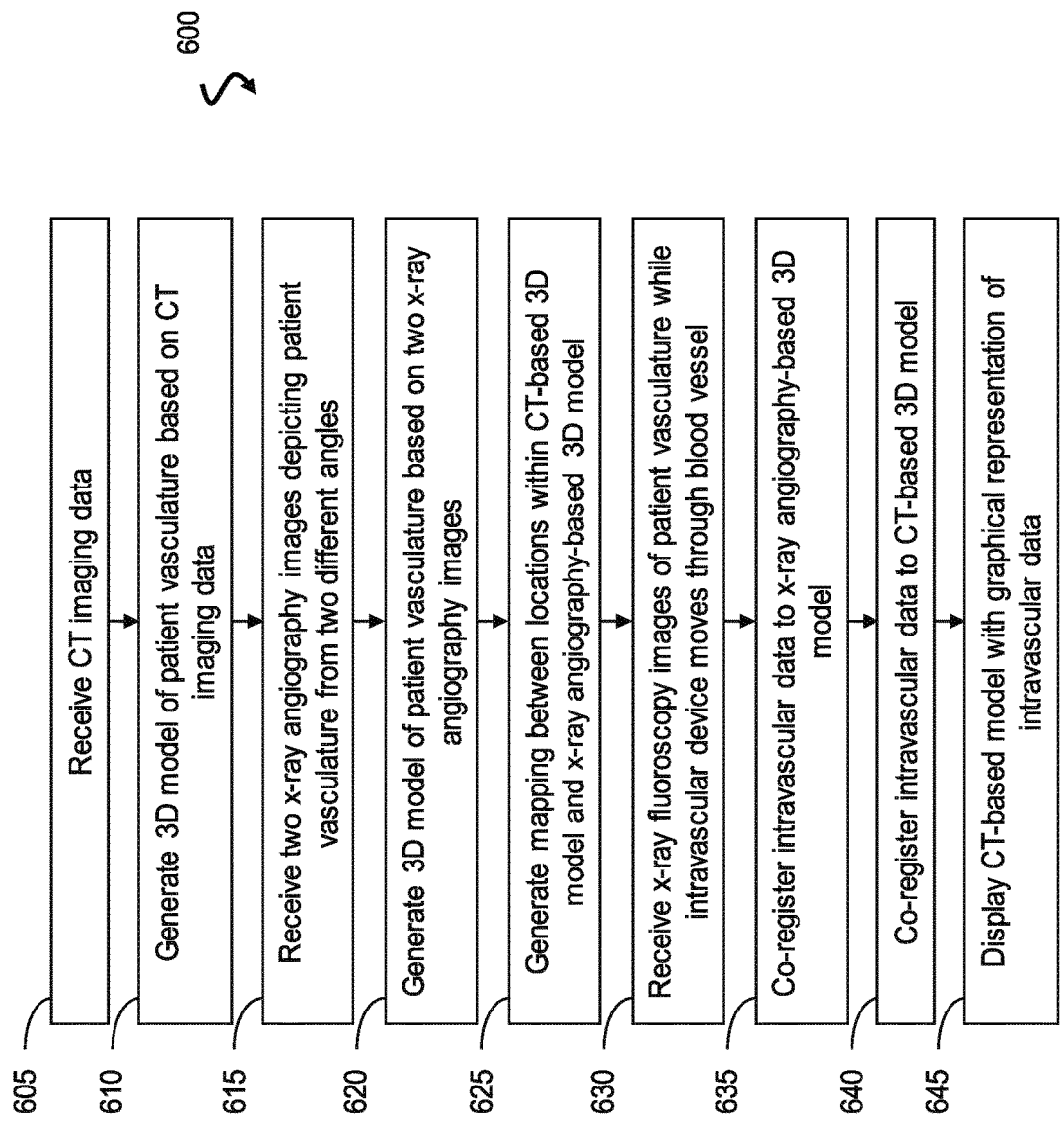
FIG. 6 is a flow diagram of a method of co-registering intravascular data with a CT-based 3D model, according to aspects of the present disclosure.

FIG. 6 is a flow diagram of a method 600 of co-registering intravascular data with a CT-based 3D model, according to aspects of the present disclosure. One or more steps of the method 600 will be described with reference to FIGS. 7-14. As illustrated, the method 600 includes a number of enumerated steps, but embodiments of the method 600 may include additional steps before, after, or in between the enumerated steps. In some embodiments, one or more of the enumerated steps may be omitted, performed in a different order, or performed concurrently. The steps of the method 600 can be carried out by any suitable component within the diagnostic system 100 and all steps need not be carried out by the same component. In some embodiments, one or more steps of the method 600 can be performed by, or at the direction of, a processor circuit of the diagnostic system 100, including, e.g., the processor 560 (FIG. 5) or any other component.

An advantage of co-registering data from different medical diagnostic modalities includes providing a user of the system 100 with accurate information relating to the position of an intravascular device 146 and/or the position of intravascular data obtain by the device 146 within the patient anatomy. The method 600 includes providing location information of the intravascular device 146 and measurements or data obtained by the device 146 in conjunction with a three-dimensional CT-based model. A user of the system 100 may then view exact location information corresponding to intravascular measurements relating to a blood vessel as a visual representation (e.g., numerical/alphanumerical, graphical, symbolic, etc.) overlaid on or otherwise in conjunction with a CT-based model. In this way, the user of the imaging system 100 need not estimate the location of measurements from an intravascular device 146 based on separate views of CT-based model, an x-ray image and/or measurement display.

At step 605, the method 600 includes receiving CT imaging data. The CT imaging data may be obtained via the CT imaging device 176 and CT processing system 174 (FIG. 1) previously described or with any other similar device and processing system. The CT imaging data may correspond to an anatomy of any suitable region or structure of a patient including any of the previously mentioned parts of a patient anatomy. In some embodiments, the CT imaging data may correspond to the vasculature of a heart acquired through a CT scanning procedure or CT scan. In some imaging procedures, a contrast agent may be introduced to the patient vasculature. The anatomy may also be imaged with the CT imaging device 176 without a contrast agent introduced to the vasculature. In procedures in which a heart is to be imaged, a contrast agent may be introduced to the coronary vasculature. As previously described, the CT imaging device 176 may acquire the CT imaging data by rotating the x-ray source 460 and the x-ray detector 470 mounted to the CT gantry 450 (FIG. 4) around the patient anatomy and acquiring x-ray imaging data at various angles in relation to the patient anatomy and across various regions of the patient anatomy.

Figure 7:
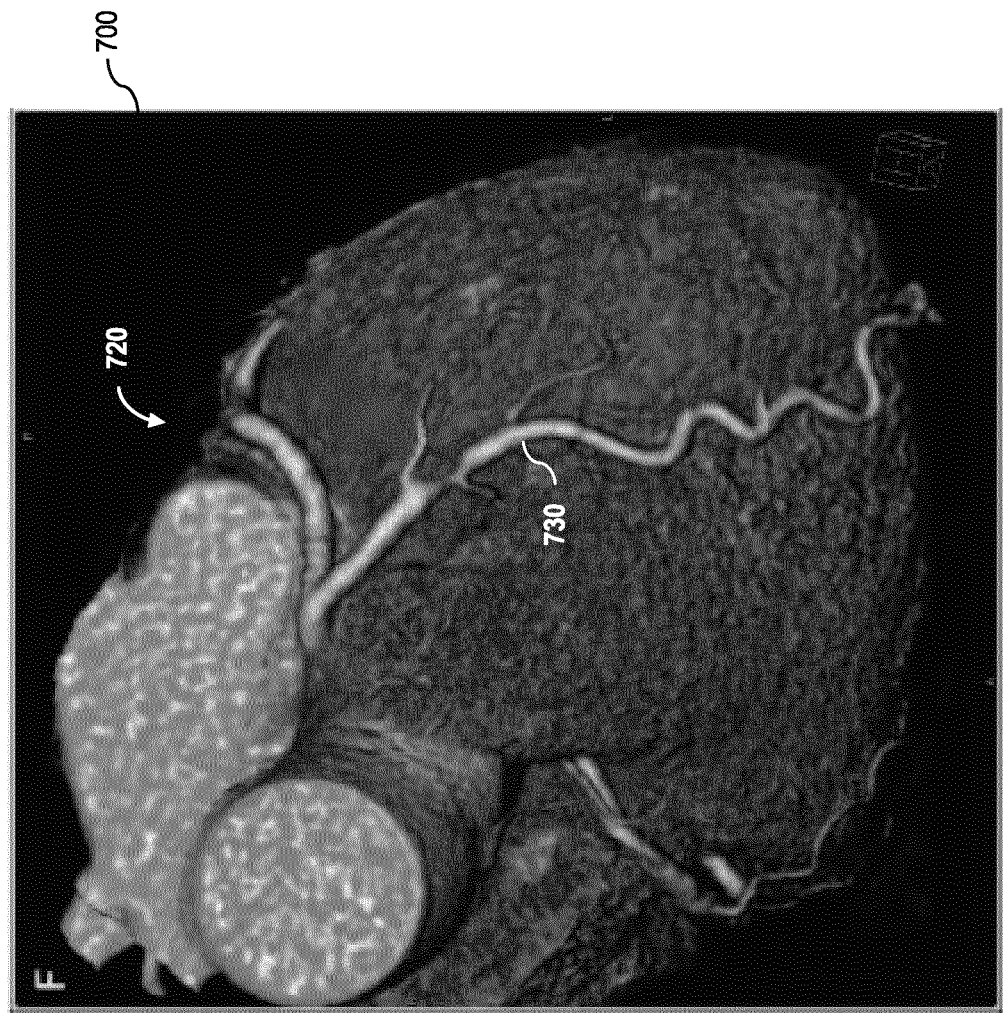
FIG. 7 is a diagrammatic view of a coronary CT-based 3D model, according to aspects of the present disclosure.

At step 610, the method 600 includes generating a three-dimensional model 700 of the patient's vasculature based on the CT imaging data. Step 610 will be described with reference to FIG. 7, which is a diagrammatic view of a CT-based 3D model 700 of a heart 720, according to aspects of the present disclosure. FIG. 7 depicts an example image of a coronary CT scan visualized as a three-dimensional model. The CT processing system 174 may use the CT imaging data obtained at step 605 with the CT imaging device 176 (FIG. 1) to reconstruct multiple two-dimensional images or slices of the patient anatomy. In some embodiments, these two-dimensional images may correspond to locations along the longitudinal axis 482 of the patient anatomy or the patient support 480 (FIG. 4). For example, one two-dimensional image may correspond to a cross-sectional slice of the patient anatomy at location along the longitudinal axis 482. These generated two-dimensional images may then be combined to construct a three-dimensional model of the anatomy, similar to the three-dimensional CT-based model 700 shown in FIG. 7. As shown in FIG. 7, the heart 720 imaged and displayed includes multiple vessels 730 extending along the surface of the heart. Features may be observed in great detail in the CT-based model 700 as well as viewed from various angles. The axes 799 show that the CT-based model 700 is a three-dimensional model.

Figure 8A:
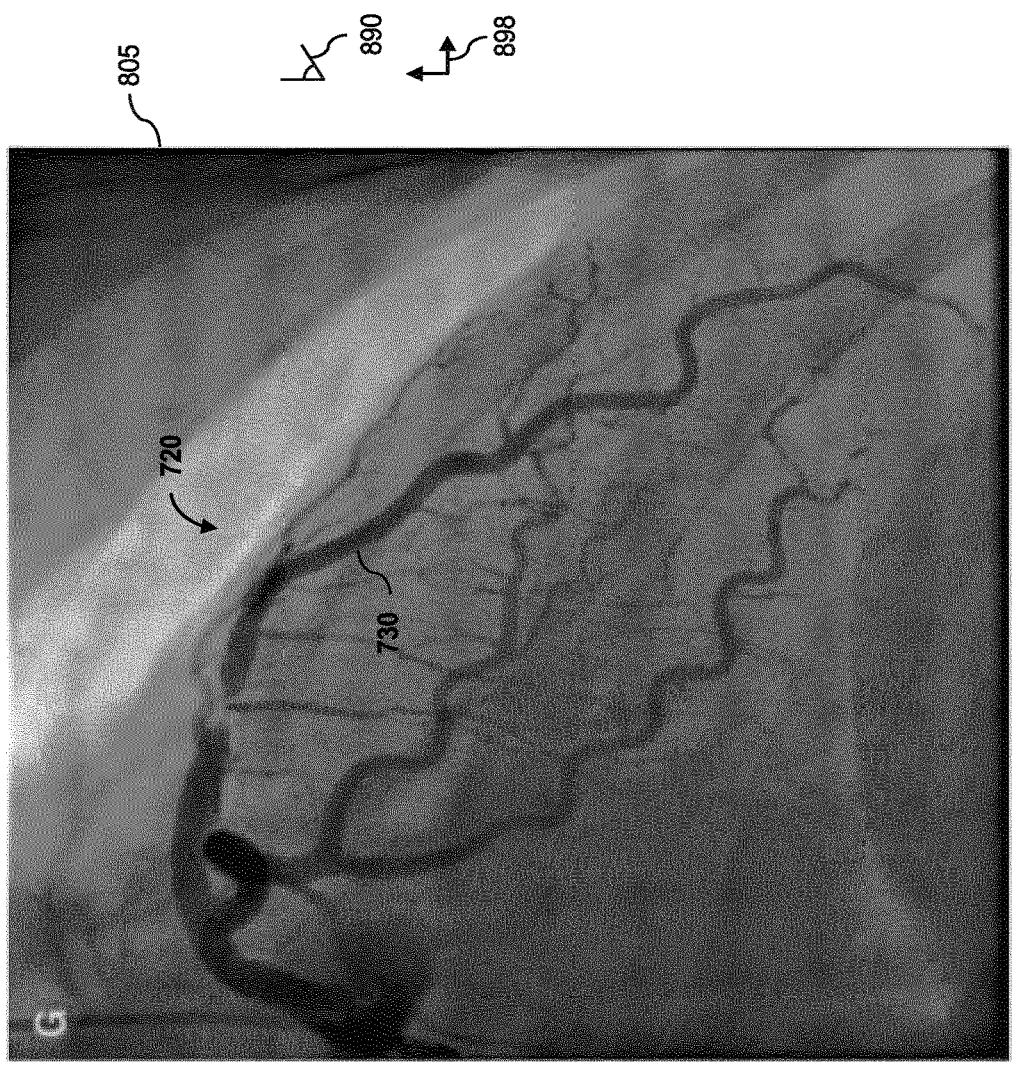
FIG. 8A is a diagrammatic view of an x-ray angiography image of vessels of a heart, according to aspects of the present disclosure.
Figure 8B:
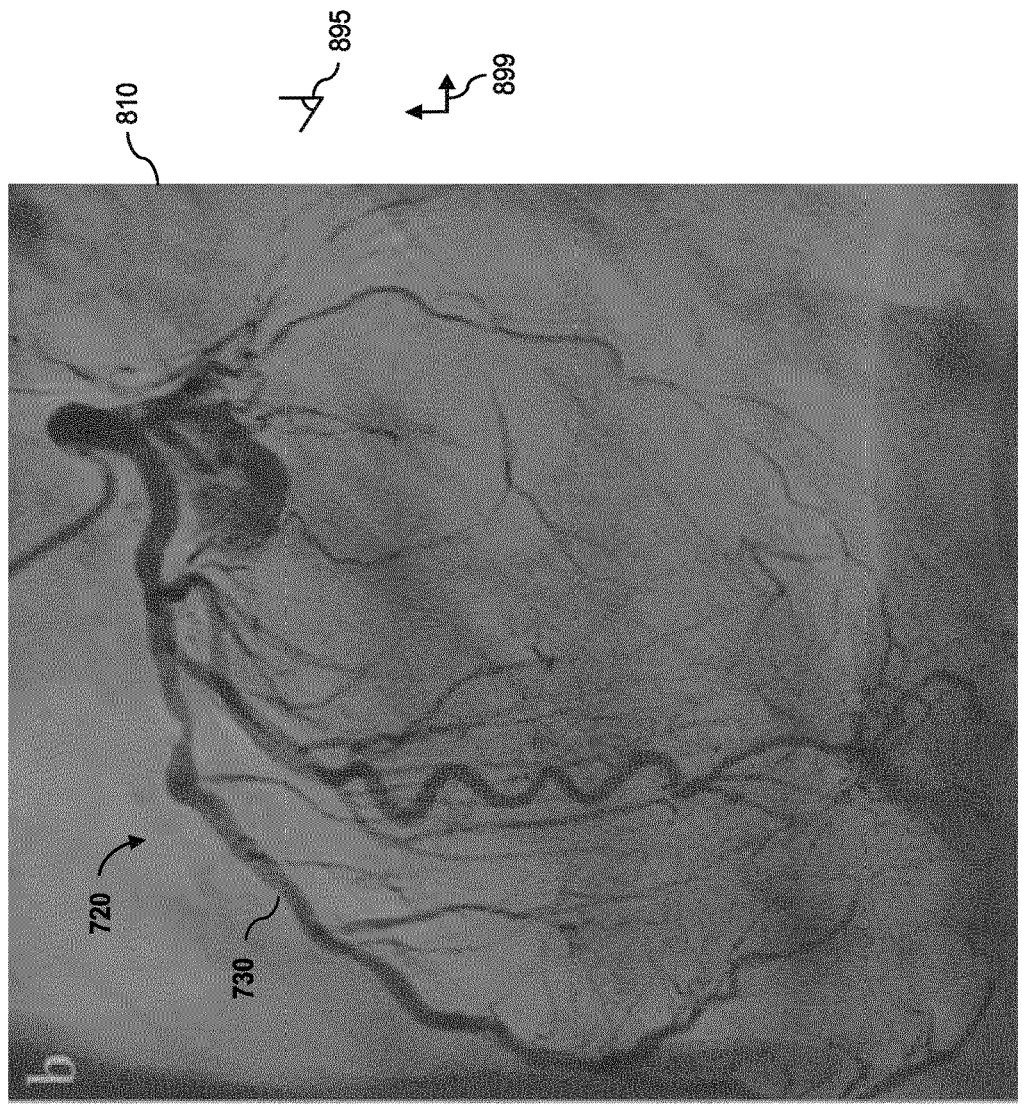
FIG. 8B is a diagrammatic view of an x-ray angiography image of the vessels of the heart shown in FIG. 8A imaged from a different angle, according to aspects of the present disclosure.
Figure 9:
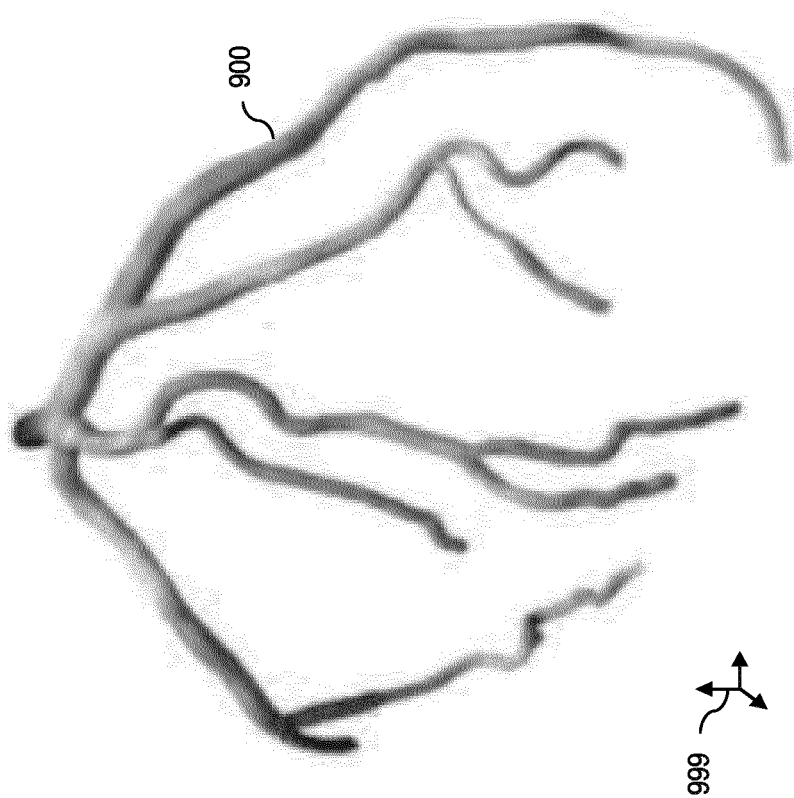
FIG. 9 is a diagrammatic view of an x-ray angiography-based 3D model of the vessels of the heart shown in FIGS. 8A and 8B, according to aspects of the present disclosure.

At step 615, the method 600 includes receiving two angiography images depicting the patient vasculature from two different angles. Step 615 will be described with reference to FIG. 8A and FIG. 8B. FIG. 8A is a diagrammatic view of an x-ray angiography image 805 of vessels 730 of the heart 720, according to aspects of the present disclosure. FIG. 8B is a diagrammatic view of an x-ray angiography image 810 of the vessels 730 of the heart 720 shown in FIG. 8A imaged from a different angle 895, according to aspects of the present disclosure.

The x-ray angiography images 805 and 810 may be acquired via the x-ray imaging device 300 (FIG. 3) or the device 156 (FIG. 1). The x-ray angiography images 805 and 810 are obtained with a contrast agent introduced to the vasculature. This radiopaque contrast agent causes the coronary vessels 730 to be more readily visible on the angiography image. The angiography image 805 may be acquired at an angle 890 in relation to the patient anatomy. For example, the x-ray source 360 and/or the x-ray detector 370 may be positioned at some angle 890 from the patient anatomy resulting in the perspective of vessels 730 shown in FIG. 8A. The axes 898 denote that the angiography image 805 is a two-dimensional image. The axes 899 denote that the angiography image 810 is a two-dimensional image.

The x-ray angiography image 810 of FIG. 8B may be acquired with the x-ray source 360 and detector 370 positioned at a different angle 895 with respect to the patient anatomy. The angiography image 810 shown in FIG. 8B shows the same vasculature of the same heart 720. Due to the different angle 895, however, the vessels 730 of the heart 720 are shown in a different arrangement. The x-ray angiography images 805 and 810 may be two-dimensional images.

The angiography images 805 and 810 may be acquired via any suitable method. For example, the angiography images 805 and 810 may be obtained by the same x-ray imaging device 156. As mentioned, the x-ray angiography device 156 may be or include the x-ray imaging device 300 of FIG. 3 or any components described with reference to FIG. 3. The vasculature of the heart 720 may be positioned between the x-ray source 360 and detector 370 (FIG. 3) at some angle 890. The angiography image 805 may then be obtained by the device 156, processed with the x-ray angiography processing system 154, and stored on a memory in communication with the co-registration processing system 134 (FIG. 1). The x-ray source 360 and detector 370 may then be positioned to angle 895 immediately after acquiring the data corresponding to image 805. The angiography image 810 may then be obtained, processed, and stored on a memory in communication with the co-registration processing system 134 (FIG. 1). During this process, the patient may remain unmoved. In some procedures, some amount of time may pass between the acquisition of angiography image 805 and image 810.

The angles 890 and 895 may be any suitable angles with respect to the patient anatomy. For example, in some embodiments, the angles 890 and 895 may correspond to left anterior oblique (LAO) and right anterior oblique (RAO) views respectively or vice versa. The angles 890 and 895 may also correspond to left posterior oblique (LPO) and right posterior oblique (RPO) views or any other suitable angle or view. In some embodiments, the angles 890 and 895 are orthogonal to one another. To ensure accurate 3D angiography-based model formation, as will be discussed with reference to step 620, the angles 890 and 895 may be positioned at least 10° from one another. In some embodiments, the x-ray source 360 and the x-ray detector 370 may be mounted to a c-arm similar to the arm 352 (FIG. 3) which may be moved around the patient to any suitable angle. In some embodiments, additional angiography images from additional angles similar to images 805 and 810 may be obtained with the x-ray angiography device 156.

In some embodiments, the x-ray angiography images 805 and 810 may be obtained with a bi-plane angiography system and method similar to the bi-plane x-ray imaging device discussed with reference to FIG. 3. For example, the x-ray angiography device 156 or 300 may include two sets of x-ray sources and x-ray detectors which may image a patient anatomy simultaneously from two different angles. In such an embodiment, the vasculature of the heart 720 may be positioned between one x-ray source and detector at some angle 890 and between a second x-ray source and detector at some different angle 895 at the same time. The angles 890 and 895 may be orthogonal to one another or may differ. The x-ray angiography device 156 may then obtain the image 805 and the image 810 simultaneously. Both images may then be processed with the x-ray angiography processing system 154 and stored on a memory in communication with the co-registration processing system 134 (FIG. 1).

At step 620, the method 600 includes generating a three-dimensional model 900 of the patient vasculature based on the two x-ray angiography images 805 and 810. Step 620 will be described with reference to FIG. 9, which is a diagrammatic view of an x-ray angiography-based three-dimensional model 900 of the coronary vessels 730 of the heart 720 shown in FIGS. 8A and 8B, according to aspects of the present disclosure.

A three-dimensional angiography-based model 900 may be reconstructed based on the two x-ray angiography images 805 and 810 according to any suitable method. For example, two angiography images 805 and 810 may be received by the system 100. Features of the two-dimensional images may be identified in each image. The features may include features of the coronary vasculature or coronary arterial tree of the heart 720. The axes 999 denote that the angiography-based model 900 is a three-dimensional model.

In some embodiments, the system 100 or a user of the system 100 may identify or mark a series of points within each angiography image 805 and 810 to define centerlines of depicted vessels including major vessels and branching vessels. The same vessels are identified in each of the two angiography images 805 and 810. The system 100, or a user of the system 100, may then identify common anatomical features depicted in both angiography images 805 and 810 including, but not limited to, occlusions or regions of constrictions of a vessel, tortuosity of a vessel, bifurcations, or lengths of a vessel, among other features. These features may be identified as points or locations within the angiography image 805 or 810. For example, for the angiography image 805, the location of a feature such as a bifurcation may be identified as a two-dimensional coordinate. This coordinate, as well as two-dimensional coordinates corresponding to all other identified features within the angiography image 805 may be organized into a matrix, $A_1$. Similarly, the same features, including the exemplary bifurcation features mentioned, are identified as different two-dimensional coordinates within the angiography image 810 and organized into an additional matrix, $A_2$.

For each matrix, $A_1$ and $A_2$, a vector R, may be determined or received corresponding to the angle at which the angiography image 805 and the angiography image 810 were acquired respectively. Specifically, a vector $R_1$ corresponding to the angle 890 may be stored in conjunction with the matrix $A_1$ and a vector $R_2$ corresponding to the angle 895 may be stored in conjunction with the matrix $A_2$. In some embodiments, a calibration matrix K may additionally be determined for each matrix, $A_1$ and $A_2$. A matrix $K_1$ may be stored in conjunction with the matrix $A_1$ and a matrix $K_2$ may be stored in conjunction with the matrix $A_2$. Additional values, constants, vectors, or matrices may additionally be determined for either matrix $A_1$ and/or matrix $A_2$. For example, values, constants, vectors, or matrices may be determined corresponding to the position of the x-ray source 360 (FIG. 3) and/or the x-ray detector 370 (FIG. 3) in relation to the location of the imaged anatomy, the conversion of points or coordinates form one coordinate system to another or from one dimension to another, scaling, any applicable offsets in the determined coordinates, or any other additional data.

Based on the acquired data relating to each image 805 and 810, including the matrices $A_1$ and $A_2$, the vectors $R_1$ and $R_2$, and/or the calibration matrices $K_1$ and $K_2$ if applicable, an equation may be developed projecting the locations of the identified features from their two-dimensional positions within the image 805 or 810 into three-dimensional space. Specifically, an equation for the angiography image 805 may be developed similar to $M=R_1K_1A_1$, in which M corresponds to the three-dimensional coordinates of the locations of the identified features in the three-dimensional angiography-based model 900. An additional similar equation, $M=R_2K_2A_2$, may be developed corresponding to the angiography image 810. As the matrices $A_1$ and $A_2$ include two-dimensional coordinates for each location of identified features and the matrix M includes three-dimensional coordinates, the two equations listed above for the images 805 and 810 together form a system of equations which may be solved to determine the three-dimensional coordinates of each identified feature to create the three-dimensional angiography-based model 900.

It is noted that in order to create the three-dimensional angiography-based model 900, at least two angiography images from two different angles or views must be acquired or provided to the system 100. The angles at which each image was acquired must also be known, though these angles may be arbitrary. The anatomy shown in the two or more input angiography images, similar to the images 805 or 810, may have contrast agent introduced.

The method of generating the three-dimensional angiography-based model 900 may include any suitable method or process and may include some features similar to those described in U.S. Pat. No. 6,501,848, titled "METHOD AND APPARATUS FOR THREE-DIMENSIONAL RECONSTRUCTION OF CORONARY VESSELS FROM ANGIOGRAPHIC IMAGES AND ANALYTICAL TECHNIQUES APPLIED THERETO" which is hereby incorporated by reference in its entirety. Generating the three-dimensional angiography-based model 900 may additionally include some features similar to those described in the publication entitled "3-D RECONSTRUCTION OF CORONARY ARTERIAL TREE TO OPTIMIZE ANGIOGRAPHIC VISUALIZATION," IEEE Trans. Med. Imag., vol. 19, no. 4, pp. 318-336, April 2000, doi: 10.1109/42.848183 by S. J. Chen and J. D. Carroll, which is also hereby incorporated by reference in its entirety.

Figure 10:
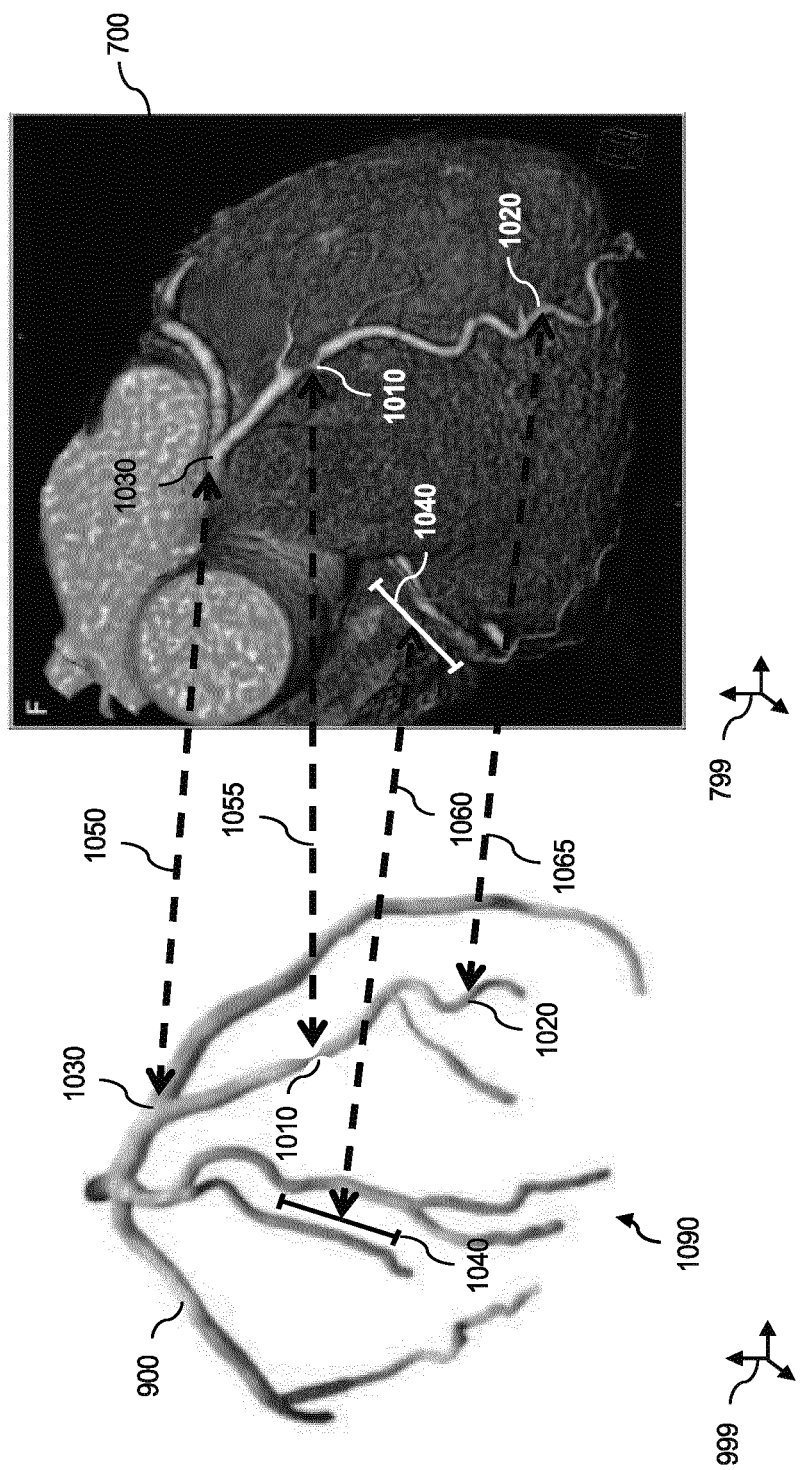
FIG. 10 is a diagrammatic view of the x-ray angiography-based 3D model of FIG. 9 and the CT-based model of FIG. 7 identifying common features of both models, according to aspects of the present disclosure.

At step 625, the method 600 includes generating a mapping between the locations of anatomical landmarks 1090 within the CT-based 3D model 700 and the x-ray angiography-based 3D model 900. Step 625 will be described with reference to FIG. 10 and FIGS. 11A-11D. FIG. 10 is a diagrammatic view of the x-ray angiography-based model 900 of FIG. 9 and the CT-based 3D model 700 of FIG. 7 identifying common features or anatomical landmarks 1090 of both models, according to aspects of the present disclosure. At step 625, the system 100 or a user of the system 100 may associate anatomical features 1090 identified in the CT-based model 700 with the same anatomical features 1090 in the angiography-based model 900. These features may be the same features previously identified in angiography images 805 and 810 used to create the three-dimensional angiography-based model 900 or may differ. This association of anatomical features in the CT-based model 700 and the angiography-based model 900 creates a mapping of physical positions or locations along the vasculature on both models.

FIG. 10 additionally depicts a number of anatomical features 1090 and their locations within the patient vasculature. The shown anatomical features 1090 include an occlusion 1010, a region of tortuosity 1020, a bifurcation 1030, and a length 1040 of a vessel. Additional anatomical features 1090 may be identified within the models including anatomical features of additional different types. Dotted arrows 1050, 1055, 1060, and 1065 identify the locations of the same anatomical features mentioned in both the CT-based model 700 and the angiography-based model 900. The anatomical landmarks 1090 identified may be any suitable type of landmark or features including fissures, angles of turns of different vessels within the anatomy, or any other suitable features, landmarks, or identifying features within the vasculature. The anatomical landmarks 1090 may additionally be referred to as anatomical features.

The occlusion 1010 shown in the angiography-based model 900 also appears in the CT-based model 700 as indicated by the arrow 1055. A mapping correspondence may be established between the location of the occlusion 1010 on the angiography-based model 900 as well as the CT-based model 700. In this way, a metric, visual representation (e.g., numerical/alphanumerical, graphical, symbolic, etc.), or any other datum associated with the occlusion 1010 calculated or received in the context of the angiography-based model 900 may be associated and presented with the same location on the CT-based model 700. Similarly, the region of tortuosity 1020 shown in the angiography-based model 900 also appears in the CT-based model 700 as indicated by the arrow 1065 and a mapping correspondence relating information of the region of tortuosity 1020 may be established similar to that described with the occlusion 1010. A mapping correspondence for the bifurcation 1030 is also shown in both models by the arrow 1050 and a mapping correspondence for the length 1040 is shown in both models by the arrow 1060. For the purposes of the present disclosure, a mapping correspondence between the same point or position within two models of different modalities and identified with a dotted, double-sided arrow similar to the arrows 1050, 1055, 1060, and/or 1065 shown in FIG. 10 refers to a correspondence in which data obtained or determined with respect to a location within one model may be applied to the same location within the other model and vice versa. A mapping correspondence may additionally be referred to as a one-to-one mapping correspondence, a one-to-one correspondence, a correspondence, a mapping relationship, a one-to-one relationship, or any other suitable term. The collection of all mapping correspondences between all common positional points within two models may be referred to as a feature mapping. The feature mapping may additionally be referred to as a mapping, a one-to-one correspondence mapping, a comprehensive mapping, or any other suitable term.

In an embodiment in which the system 100 identifies the previously listed and described anatomical landmarks 1090, the system 100 may identify anatomical landmarks via any suitable method. For example, the system 100 may employ image processing techniques such as a global shift algorithm, warping algorithm, path solving algorithm, calibration algorithm, motion compensation algorithm, modified mean shift algorithm, or any other suitable algorithm, technique, or method. In addition, the system 100 may segment received images or models or perform various other steps to identify anatomical features 1090. In other embodiments, the system 100 may employ artificial intelligence techniques such as a deep learning network to identify anatomical features 1090. The deep learning network used may include a convolutional neural network, a multi-class classification network, an encoder-decoder type network, or others. The deep learning network may additionally employ processing algorithms such as convolutional layers, fully convolutional layers, fully connected layers, feature vectors, or other algorithms or techniques. In some embodiments, a deep learning network may be trained to identify anatomical landmarks 1090 based on trained classification outputs and associated confidence scores.

The feature mapping of locations within the vasculature on the angiography-based model 900 and the CT-based model 700 may be configured to allow a user to correlate any location along a vessel shown in either model to the other model. To achieve this comprehensive one-to-one feature mapping between the models, the mapping correspondences shown in FIG. 10 between identified landmarks 1090 must be expanded or extrapolated to the entire model 900 and model 700. In such a configuration, a user of the system 100 may select or identify any location, including locations not associated with an identified landmark, on the angiography-based 900 and the system 100 may identify the same location on the CT-based model 700 and vice versa. FIGS. 11A-11D illustrate an exemplary method of expanding the model-to-model mapping described in FIG. 10 to include the entire model 900 and model 700, though any suitable method may be used.

Figure 11A:
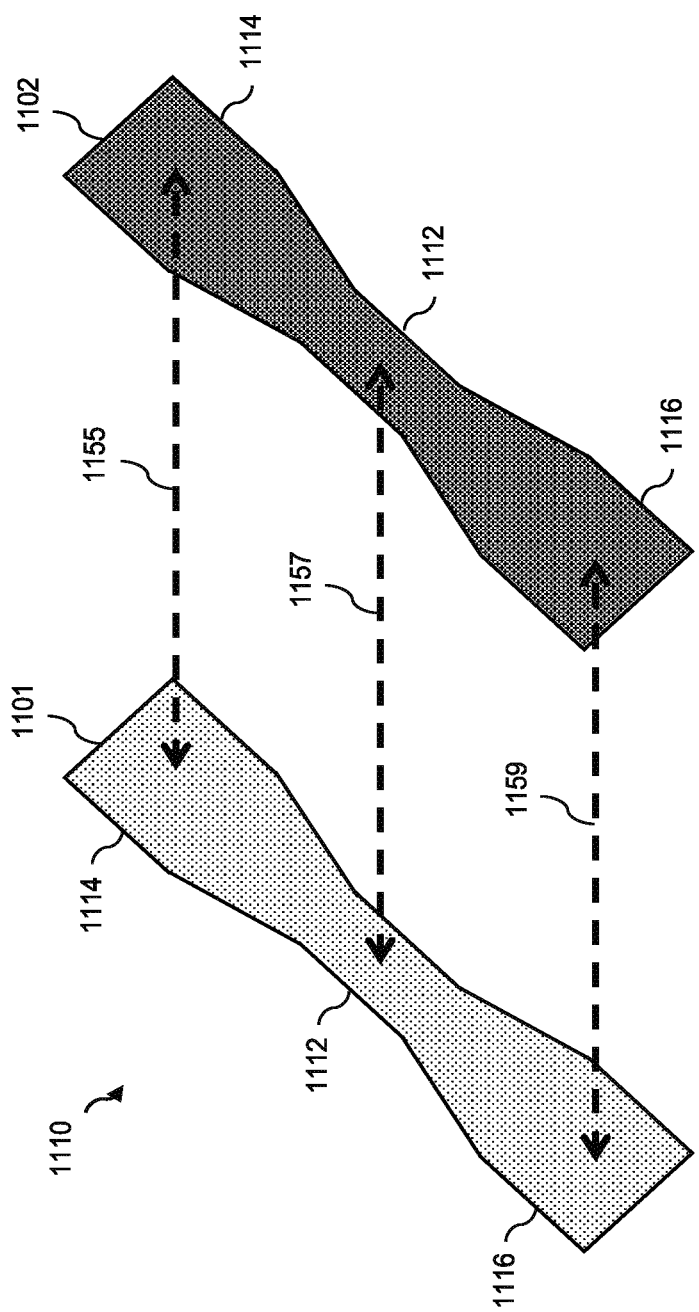
FIG. 11A is a diagrammatic view of an occlusion common to two models of the same anatomy, according to aspects of the present disclosure.

FIG. 11A is a diagrammatic view of an occlusion 1110 common to two models of the same anatomy, according to aspects of the present disclosure. The models may be generated based on data of different modalities. The occlusion 1110 may be similar to the occlusion 1010 discussed with reference to FIG. 10. Specifically, the occlusion 1110 may be a visual representation of a constricted region of a blood vessel. FIG. 11A depicts a region of a model 1101 showing the occlusion 1110. The model 1101 may be an angiography-based three-dimensional model. FIG. 11A also depicts a region of a model 1102 showing the occlusion 1110. The model 1102 may be a model based on a different imaging modality, such as a CT-based three-dimensional model. Each model 1101 and 1102 includes a point of occlusion 1112, an upper region 1114, and a lower region 1116. FIG. 11A additionally depicts arrows 1155, 1157, and 1159.

The system 100 may identify a point of occlusion 1112 in both the model 1101 and the model 1102. The system 100 may then establish a mapping correspondence between the point of occlusion 1112 identified in the model 1101 and the point of occlusion 1112 in the model 1102. In FIG. 11A, this mapping correspondence may be represented by the arrow 1157. This mapping correspondence may be similar to the mapping correspondences between landmark features 1090 as shown by the arrows 1050, 1055, 1060, and/or 1065 of FIG. 10. Specifically, the mapping correspondence shown by the arrow 1157 may indicate that data associated with the occlusion 1112 shown in the model 1101 may be associated and presented with the same location on the model 1102.

The system 100 may additionally establish a correspondence between locations near the occlusion 1112 shown. In an embodiment, a point may be selected in the region 1114 of the model 1101. The system 100 may calculate, via any of the previously mentioned image processing or artificial intelligence techniques, the distance between the selected point in the region 1114 and the point of occlusion 1112. The system may then identify the same point in the region 1114 on the model 1102 based on this determined distance. In some embodiments, the system 100 may additionally determine an angle or vector corresponding to the difference in positions between the selected point in the region 1114 and the point 1112. Once the selected point has been identified in both the models 1101 and 1102, a mapping correspondence or relationship, as shown by the arrow 1155, may be established. This mapping correspondence may be similar to the that illustrated by the arrow 1157. The system 100 may apply this same technique to identify locations that may be selected on the model 1102. In other words, points may be selected on either the model 1101 or the model 1102, the system 100 may determine the position of points relative to the occlusion 1112 on either the model 1101 or the model 1102, and the same points may then be identified on the other model.

Similarly, a point may be selected in the region 1116 of the model 1101. The system 100 may calculate the distance and/or the angle or vector between the selected point in the region 1116 and the point of occlusion 1112. The system may then identify the same point in the region 1116 on the model 1102 based on this determined distance and/or angle or vector. A similar mapping correspondence, as shown by the arrow 1159, may be established. This correspondence may be similar to the that illustrated by the arrow 1155 or 1157. The system 100 may follow a similar process to establish a one-to-one correlation between any point or position along the model 1101 and the model 1102.

Figure 11B:
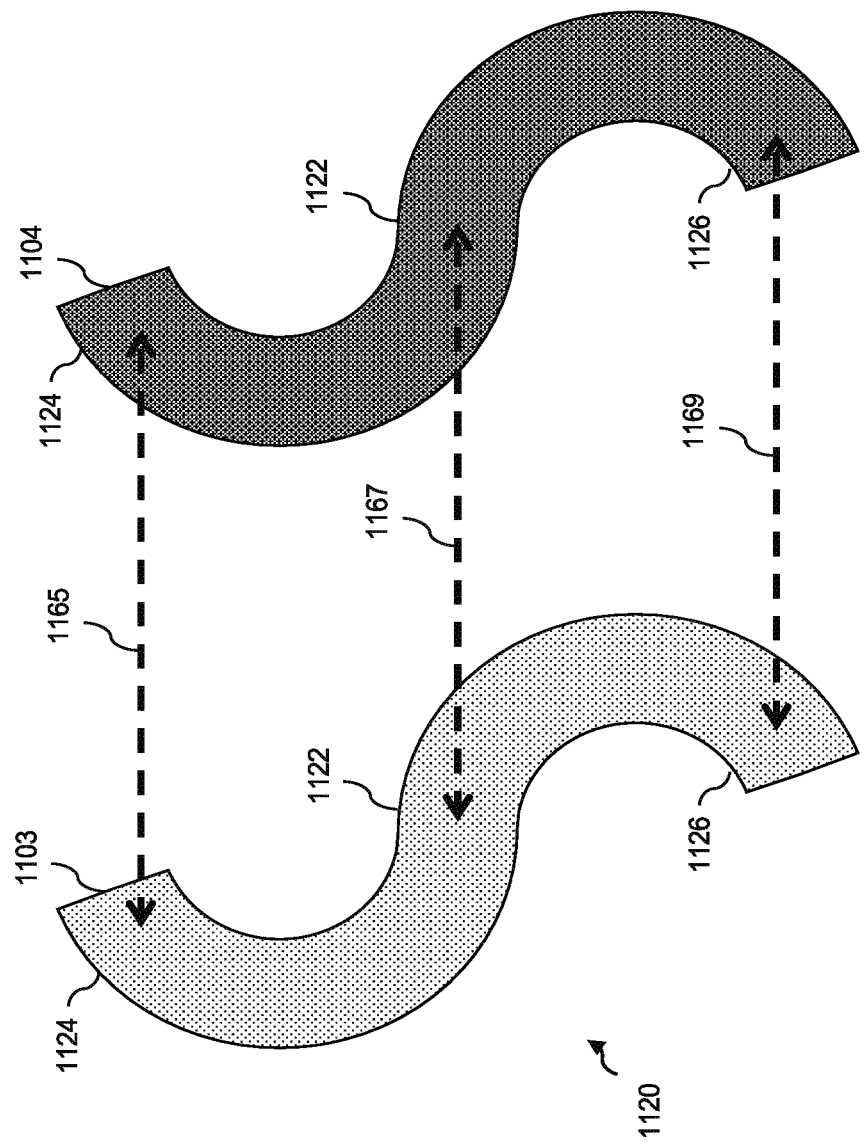
FIG. 11B is a diagrammatic view of a region of tortuosity common to two models of the same anatomy, according to aspects of the present disclosure.

FIG. 11B is a diagrammatic view of a region of tortuosity 1120 common to two models of the same anatomy, according to aspects of the present disclosure. The region of tortuosity 1120 may be similar to the region of tortuosity 1020 discussed with reference to FIG. 10. FIG. 11B depicts a region of a model 1103 showing the region of tortuosity 1120. The model 1103 may be an angiography-based model. FIG. 11B also depicts a region of a model 1104 showing the region of tortuosity 1120. The model 1104 may be a model based on a different imaging modality, such as a CT-based three-dimensional model. Each model 1103 and 1104 may include an identified point or location 1122 along the vessel, an upper region 1124, and a lower region 1126. FIG. 11B additionally depicts arrows 1165, 1167, and 1169.

The system 100 may identify a point 1122 in both the model 1103 and the model 1104. This point 1122 may correspond to a center point of the region of tortuosity 1120 or may correspond to any other location or feature within the region 1120. The system 100 may then establish a mapping correspondence between the point 1122 identified in the model 1103 and the same point 1122 in the model 1104. This mapping correspondence is represented by the arrow 1167. This mapping correspondence, like those previously discussed, may indicate that data associated with the point 1122 shown in the model 1103 may be associated with the same location on the model 1104.

The system 100 may additionally establish a mapping correspondence between locations near the point 1122 shown. In an embodiment, a point may be selected in the region 1124 of the model 1103. The system 100 may calculate, via any of the previously mentioned imaging processing or artificial intelligence techniques, the distance between the selected point in the region 1124 and the point 1122. The system 100 may determine this distance as a straight line directly from the selected point in the region 1124 and the point 1122 or may be a distance along the path of the vessel. The system 100 may also determine an angle or vector between the two points. The system 100 may then identify the same point in the region 1124 on the model 1104 based on this determined distance and/or angle or vector. Once the selected point has been identified in both the models 1103 and 1104, a mapping correspondence as shown by the arrow 1165 may be established. Points may be selected on either the model 1103 or the model 1104 and determined on the other model or vice versa as previously mentioned with reference to models 1101 and 1102 of FIG. 11A.

Similarly, a point may be selected in the region 1126 of the model 1103. The system 100 may calculate the distance and/or the angle or vector between the selected point in the region 1126 and the point 1122. The system may then identify the same point in the region 1126 on the model 1104 based on this determined distance and/or angle or vector. A similar mapping correspondence, as shown by the arrow 1159, may be established.

Figure 11C:
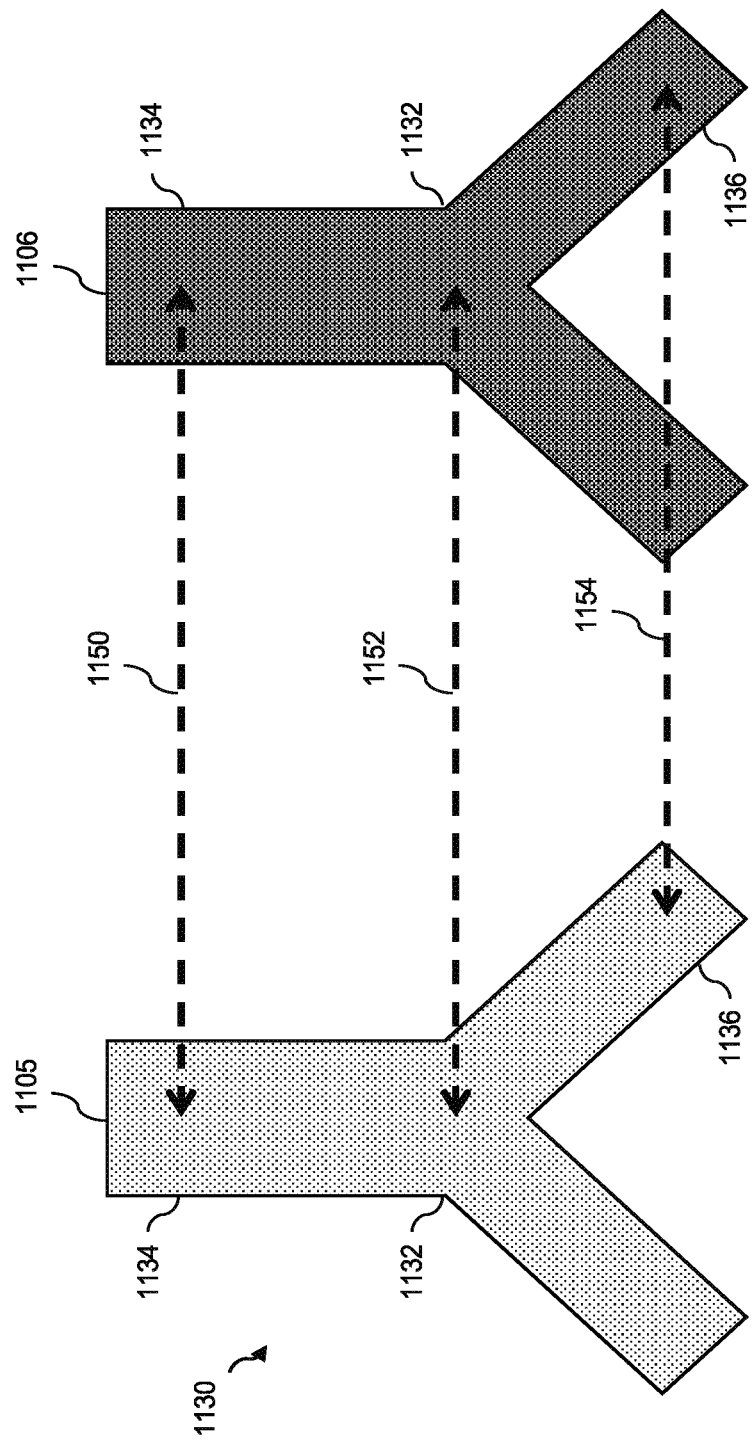
FIG. 11C is a diagrammatic view of a bifurcation common to two models of the same anatomy, according to aspects of the present disclosure.

FIG. 11C is a diagrammatic view of a bifurcation 1130 common to two models of the same anatomy, according to aspects of the present disclosure. The bifurcation 1130 may be similar to the bifurcation 1030 discussed with reference to FIG. 10. FIG. 11C depicts a region of a model 1105 showing the bifurcation 1130. The model 1105 may be an angiography-based model. FIG. 11C also depicts a region of a model 1106 showing the bifurcation 1130. The model 1106 may be a model based on a different imaging modality, such as a CT-based three-dimensional model. Each model 1105 and 1106 may include an identified point or location 1132, an upper region 1134, and a lower region 1136. FIG. 11C additionally depicts arrows 1150, 1152, and 1154.

The system 100 may identify a point 1132 in both the model 1105 and the model 1106. This point 1132 may correspond to the point of bifurcation 1130 or may correspond to any other location or feature. The system 100 may then establish a mapping correspondence between the point 1132 identified in the model 1105 and the same point 1132 in the model 1106. This mapping correspondence is represented by the arrow 1152.

The system 100 may additionally establish a mapping correspondence between locations near the point 1132 shown. A point may be selected in the region 1134 of the model 1105. The system 100 may calculate the distance and/or an angle or vector between the selected point in the region 1134 and the point 1132. The system 100 may then identify the same point in the region 1134 on the model 1106 based on this determined distance and/or angle or vector. Once the selected point has been identified in both the models 1105 and 1106, a mapping correspondence as shown by the arrow 1150 may be established. Points may be selected on either the model 1105 or the model 1106 and determined on the other model or vice versa.

Similarly, a point may be selected in the region 1136 of the model 1105. The system 100 may calculate the distance and/or the angle or vector between the selected point in the region 1136 and the point 1132. The system may then identify the same point in the region 1136 on the model 1106 based on this determined distance and/or angle or vector. A similar mapping correspondence, as shown by the arrow 1154, may be established.

Figure 11D:
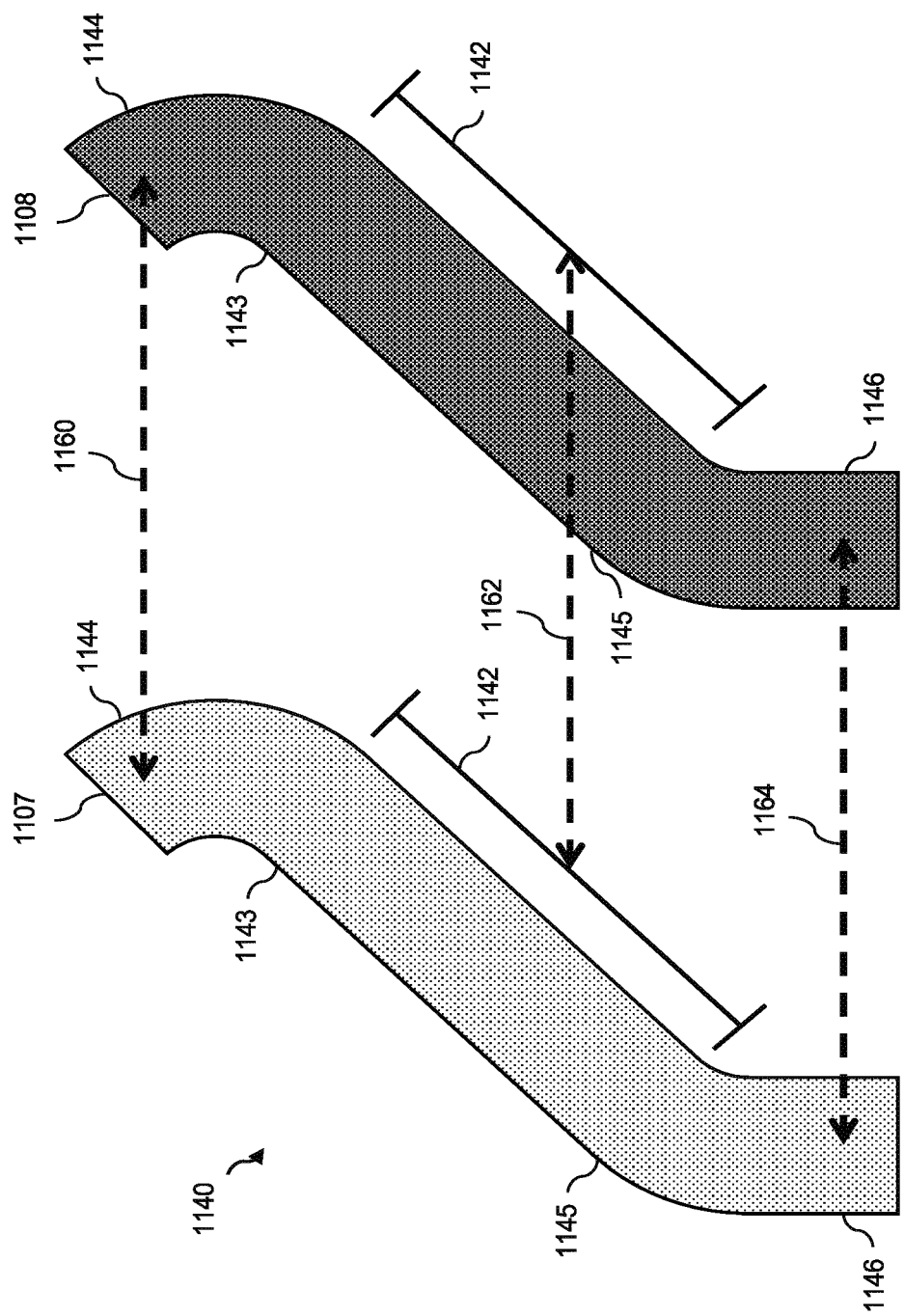
FIG. 11D is a diagrammatic view of a length of a vessel common to two models of the same anatomy, according to aspects of the present disclosure.

FIG. 11D is a diagrammatic view of a length 1142 of a vessel common to two models of the same anatomy, according to aspects of the present disclosure. The length 1142 may be similar to the length 1040 discussed with reference to FIG. 10. FIG. 11D depicts a region 1140 of a model 1107 showing the length 1142. The model 1107 may be an angiography-based model. FIG. 11C also depicts a region of a model 1108 showing the length 1142. The model 1108 may be a model based on a different imaging modality, such as a CT-based three-dimensional model. Each model 1107 and 1108 may include the same length 1142 extending between a point 1143 and a point 1145 along the vessel. Each model 1107 and 1108 additionally depicts, an upper region 1144, and a lower region 1146. FIG. 11C additionally depicts arrows 1160, 1162, and 1164.

The system 100 may identify a point along the length 1142. This point may be the point 1143 or the point 1145 or some point therebetween. This same point may be identified in both the model 1107 and the model 1108. The system 100 may then establish a mapping correspondence between the point identified in the model 1107 and the same point in the model 1108. In some embodiments, the system 100 may identify the entire length 1142 in both the model 1107 and 1108 and establish a mapping correspondence between the length 1142 shown in the model 1107 and the length 1142 shown in the model 1108. This mapping correspondence, either between the length 1142 in both models, or some point along the length 1142 in both models, is represented by the arrow 1162.

The system 100 may additionally establish a mapping correspondence between locations near the length 1142 shown. A point may be selected in the region 1144 of the model 1107. The system 100 may calculate the distance and/or an angle or vector between the selected point in the region 1134 and the length 1142. This distance and/or angle or vector may correspond to the position of the selected point in the region 1144 relative to the point 1143, the point 1145, or some point therebetween. The system 100 may identify the same selected point in the region 1144 on the model 1108 based on the determined distance and/or angle or vector. Once the selected point has been identified in both the models 1107 and 1108, a mapping correspondence as shown by the arrow 1160 may be established. Points may be selected on either the model 1107 or the model 1108 and determined on the other model or vice versa.

Similarly, a point may be selected in the region 1146 of the model 1107. The system 100 may calculate the distance and/or the angle or vector between the selected point in the region 1146 and any suitable point along the length 1142. The system may then identify the same selected point in the region 1146 on the model 1108 based on this determined distance and/or angle or vector. A similar mapping correspondence, as shown by the arrow 1164, may be established.

Using the technique outlined with reference to FIGS. 11A-11D, the system 100 may build a comprehensive feature mapping between two models of the same anatomy obtained with different imaging modalities. Using such a feature mapping, any point along an imaged vessel within one three-dimensional model may be identified in the other three-dimensional model. Similarly, any image, metric, or other data associated with any point along an imaged vessel in one three-dimensional model may be provided or displayed in the other three-dimensional model.

At step 630, the method 600 includes receiving x-ray fluoroscopy images 1210 of the patient vasculature while an intravascular device 1220 moves through a blood vessel. Step 630 will be described with reference to FIG. 12, which is a schematic diagram illustrating a relationship between x-ray fluoroscopy images 1210, intravascular images 1230, a path 1240 defined by the motion of an intravascular device 1220, and the x-ray angiography-based 3D model 900, according to aspects of the present disclosure.

At step 630, the patient anatomy may be imaged with an x-ray device while a physician performs a pullback with an intravascular device 1220 such that the intravascular device 1220 moves through a blood vessel of the anatomy. The x-ray device used to obtain the fluoroscopy images 1210 may be substantially similar to the x-ray device 300 of FIG. 3 or the x-ray fluoroscopy imaging device 166 of FIG. 1. In some embodiments, the fluoroscopy images 1210 may be obtained while no contrast agent is present within the patient vasculature. Such an embodiment is shown in the fluoroscopy images 1210 in FIG. 12. The radiopaque portion of the intravascular device 1220 is visible within the displayed fluoroscopy image 1210 as indicated by the circle 1225. The fluoroscopy images 1210 may correspond to a continuous image stream of fluoroscopy images and may be obtained as the patient anatomy is exposed to a reduced dose of x-radiation. It is noted that the fluoroscopy images 1210 may be acquired with the x-ray source 360 and the x-ray detector 370 positioned at any suitable angle in relation to the patient anatomy. The angle of the source 360 and detector 370 need not be at the same position of either of the angiography images 805 or 810 previously acquired as described with reference to FIGS. 8A and 8B, though it may be. The fluoroscopy images 1210 are two-dimensional as shown by axes 1098

The intravascular device 1220 may be any suitable intravascular device. The device may be substantially similar to the device 146 of FIGS. 1 and 2, including any of its described embodiments. As the intravascular device 1220 moves through the patient vasculature, the x-ray imaging system may acquire multiple fluoroscopy images showing the radiopaque portion of the intravascular device 1220. In this way, each fluoroscopy image 1210 shown in FIG. 12 may depict the intravascular device 1220 positioned at a different location such that the x-ray system may track the position of the intravascular device 1220 over time.

As the intravascular device 1220 is pulled through the patient vasculature, it may acquire intravascular data 1230. In an example, the intravascular data 1230 shown in FIG. 12 may be IVUS images. However, the intravascular data may be any suitable data, including IVUS images, FFR data, iFR data, OCT data, or any other measurements or metrics relating to blood pressure, blood flow, lumen diameter, or other physiological data acquired during a pullback of an intravascular device.

As the physician pulls the intravascular device 1220 through the patient vasculature, the system 100 may identify locations of=the intravascular data 1230 within the fluoroscopy images 1210, as indicated by the arrow 1262. In this way, each intravascular measurement acquired by the intravascular device 1220 may be associated with a position within the patient anatomy. For example, the IVUS image 1230 shown in FIG. 12 may be associated with the fluoroscopy image 1210. The IVUS image 1230 may be an image acquired by the intravascular device 1220 at a position within the vasculature and within the fluoroscopy image 1210 as shown by the circle 1225. Similarly, an additional IVUS image 1230 may be associated with an additional fluoroscopy image 1210 showing the intravascular device 1220 at a new location within the image 1210.

Any suitable number of IVUS images or other intravascular data 1230 may be acquired during an intravascular device pullback and any suitable number of fluoroscopy images 1210 may be obtained. In some embodiments, there may be a one-to-one ratio of fluoroscopy images 1210 and intravascular data 1230. In other embodiments, there may be differing numbers of fluoroscopy images 1210 and/or intravascular data 1230. The process of co-registering the intravascular data 1230 with the fluoroscopy images 1210 at step 630 may include some features similar to those described in U.S. Pat. No. 7,930,014, titled, "VASCULAR IMAGE CO-REGISTRATION," and filed Jan. 11, 2006, which is hereby incorporated by reference in its entirety. The co-registration process may also include some features similar to those described in U.S. Pat. Nos. 8,290,228, 8,463,007, 8,670,603, 8,693,756, 8,781,193, 8,855,744, and 10,076,301, all of which are also hereby incorporated by reference in their entirety.

The different positions of the intravascular device 1220 as shown in the fluoroscopy images 1210 may define a two-dimensional path 1240, as shown by the arrow 1260. The two-dimensional path 1240 reflects the path of the intravascular device 1220 as it moved through the patient vasculature. The two-dimensional path 1240 defines the path as measured by the x-ray device which acquired the fluoroscopy images 1210, and therefore shows the path from the same angle at which the fluoroscopy images were acquired. The axes 1099 denotes that the path 1240 is two-dimensional.

As shown by the arrow 1264, because the two-dimensional path 1240 is generated based on the fluoroscopy images 1210, each position along the two-dimensional path 1240 may be associated with one or more fluoroscopy images 1210. As an example, at a location 1241 along the path 1240, the fluoroscopy image 1210 may depict the intravascular device 1220 at that same position 1241. In addition, because a correspondence was also established between the fluoroscopy images 1210 and the intravascular data 1230 as shown by the arrow 1262, intravascular data 1230, such as the IVUS image shown, may also be associated with the location 1241 along the path 1240 as shown by the arrow 1266. In some embodiments, this correspondence may be established by comparing time stamps or other temporal data associated with the fluoroscopy images 1210 and the IVUS images 1230.

Figure 12:
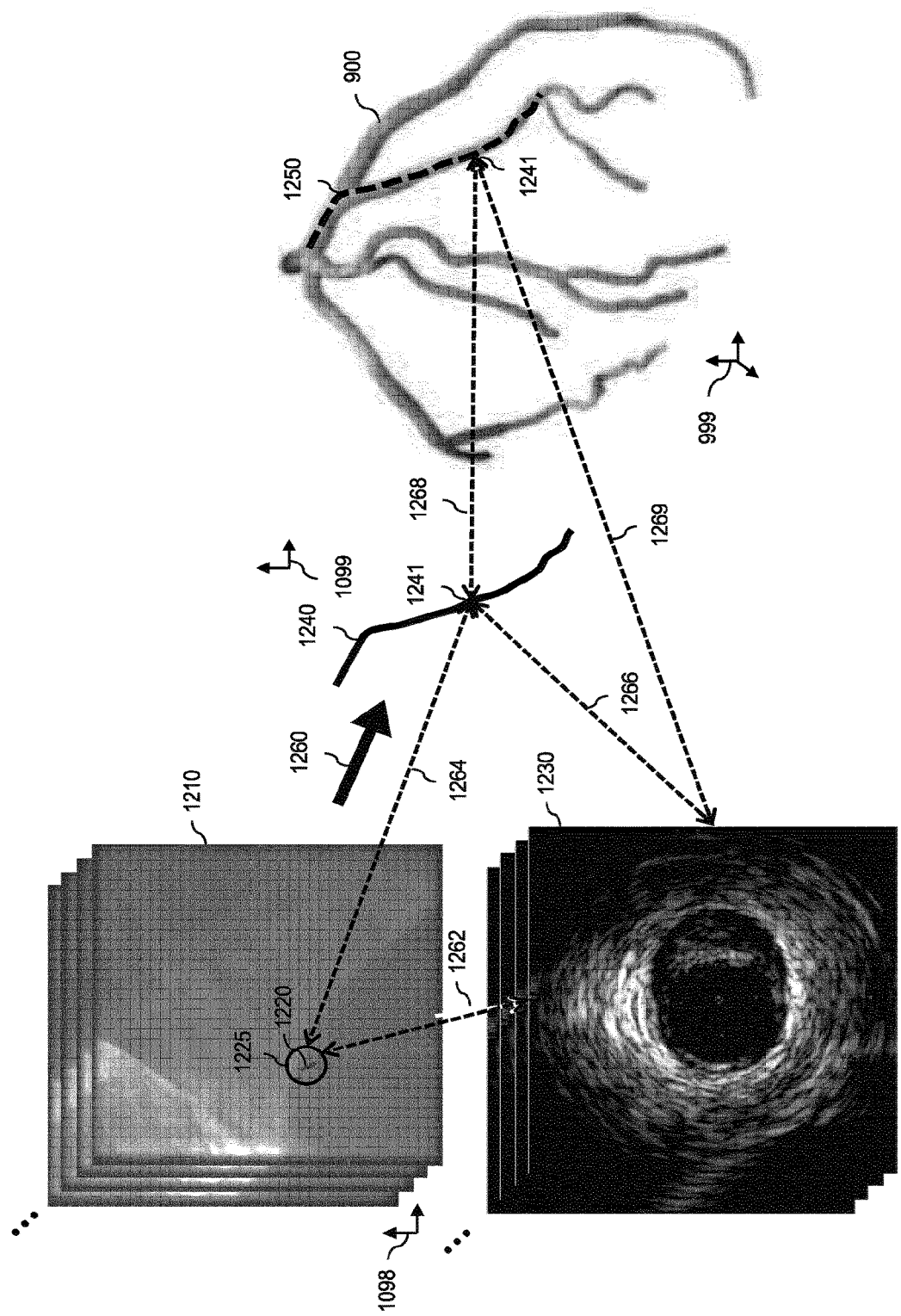
FIG. 12 is a diagrammatic view of a relationship between x-ray fluoroscopy images, intravascular data, a path defined by the motion of an intravascular device, and an x-ray angiography-based 3D model, according to aspects of the present disclosure.

At step 635, the method 600 includes co-registering the intravascular data 1230 to the x-ray angiography-based model 900. For example, a processor circuit can apply a 3D transformation matrix to project a 2D model to a 3D model based on the angle at which the 2D view is taken. The step 635 will also be described with reference to FIG. 12. After the two-dimensional path 1240 is generated based on the fluoroscopy images 1210, the path 1240 may be projected onto the three-dimensional angiography-based model 900 described with reference to FIG. 9. Because the angle at which the fluoroscopy images 1210 were obtained is known, this same angle may be used to project the two-dimensional path 1240 onto the angiography-based three-dimensional model 900 as shown in FIG. 12. In an example, the coordinates of the two-dimensional path 1240 may be stored as an additional matrix $A_3$. The matrix $A_3$ may then be multiplied by a transformation matrix corresponding to the angle at which the fluoroscopy images 1210 were obtained and the three-dimensional coordinates of same vessel within the angiography-based 3D model 900 as stored in matrix M described previously. The result may map the locations of pathway 1240 to the 3D angiography-based model 900. This projection of the 2D path 1240 to the 3D angiography-based model 900 may also use any of the same or similar mathematical processes relating to matrix transformations or matrix projections previously presented with reference to FIG. 9. The system 100 may use the known angle at which the fluoroscopy images 1210 were obtained during the matrix transformation process. In this way, the two-dimensional path 1240 may become a three-dimensional path 1250 overlaid on the three-dimensional model 900. Just as different fluoroscopy images 1210 and intravascular data 1230 were associated with various locations along the two-dimensional path 1240, the fluoroscopy images 1210 and intravascular data 1230 may be associated with the same locations along the three-dimensional path 1250 on the angiography-based three-dimensional model 900 as shown by the arrow 1268 and the arrow 1269. For example, the same location 1241 may be identified on the angiography-based model 900 using any of the techniques previously described. The same fluoroscopy images 1210 associated with the location 1241 on the two-dimensional path 1240 may be associated with the same location 1241 on the three-dimensional path 1250 and three-dimensional model 900. Similarly, the same intravascular data 1230 associated with the location 1241 on the two-dimensional path 1240 may also be associated with the same location 1241 on the three-dimensional path 1250 and three-dimensional model 900.

In some embodiments, the two-dimensional path 1240 need not be generated by the system 100. Rather, the locations of the intravascular device 1220, as shown in the fluoroscopy images 1210, may be directly projected to the three-dimensional angiography-based model 900 using the same or similar matrix projection techniques previously described. The intravascular data may additionally be directly associated with the three-dimensional model 900 without generating a two-dimensional path 1240.

The procedures described thus far, including obtaining CT data to generate a CT-based model 700 (FIG. 7), obtaining two x-ray angiography images 805 and 810 (FIGS. 8A and 8B) at different angles, and obtaining intravascular data 1230 and fluoroscopy images 1210 may be performed at various times in relation to one another. In some embodiments, each procedure may be performed concurrently such that one procedure is completed immediately following another. In other embodiments, more time may pass between each procedure. The amount of time between each procedure may be limited to prevent significant change to the patient anatomy between each procedure. Such change may be a result of natural growth, trauma, healing, therapy, or any other event or process which may alter the patient anatomy between procedures. The length of time between each procedure may be between one day and several months. However, the length of time between the listed procedures should not exceed one year.

At step 640, the method 600 includes co-registering the intravascular data 1230 to the CT-based model 700. As illustrated in FIG. 12 and described in steps 630 and 635, the angiography-based three-dimensional model 900 may include all of the fluoroscopy images 1210 and intravascular data 1230 obtained at step 630. In other words, each position of the three-dimensional path 1250 may have associated fluoroscopy images 1210 and intravascular data 1230. Using the feature mapping which links locations within the angiography-based model 900 and the CT-based model 700 (see FIG. 10), the same fluoroscopy images 1210 and intravascular data 1230 associated with positions along the three-dimensional path 1250 may be associated with the same positions on the CT-based three-dimensional model 700 (FIG. 7, 10).

Figure 13:
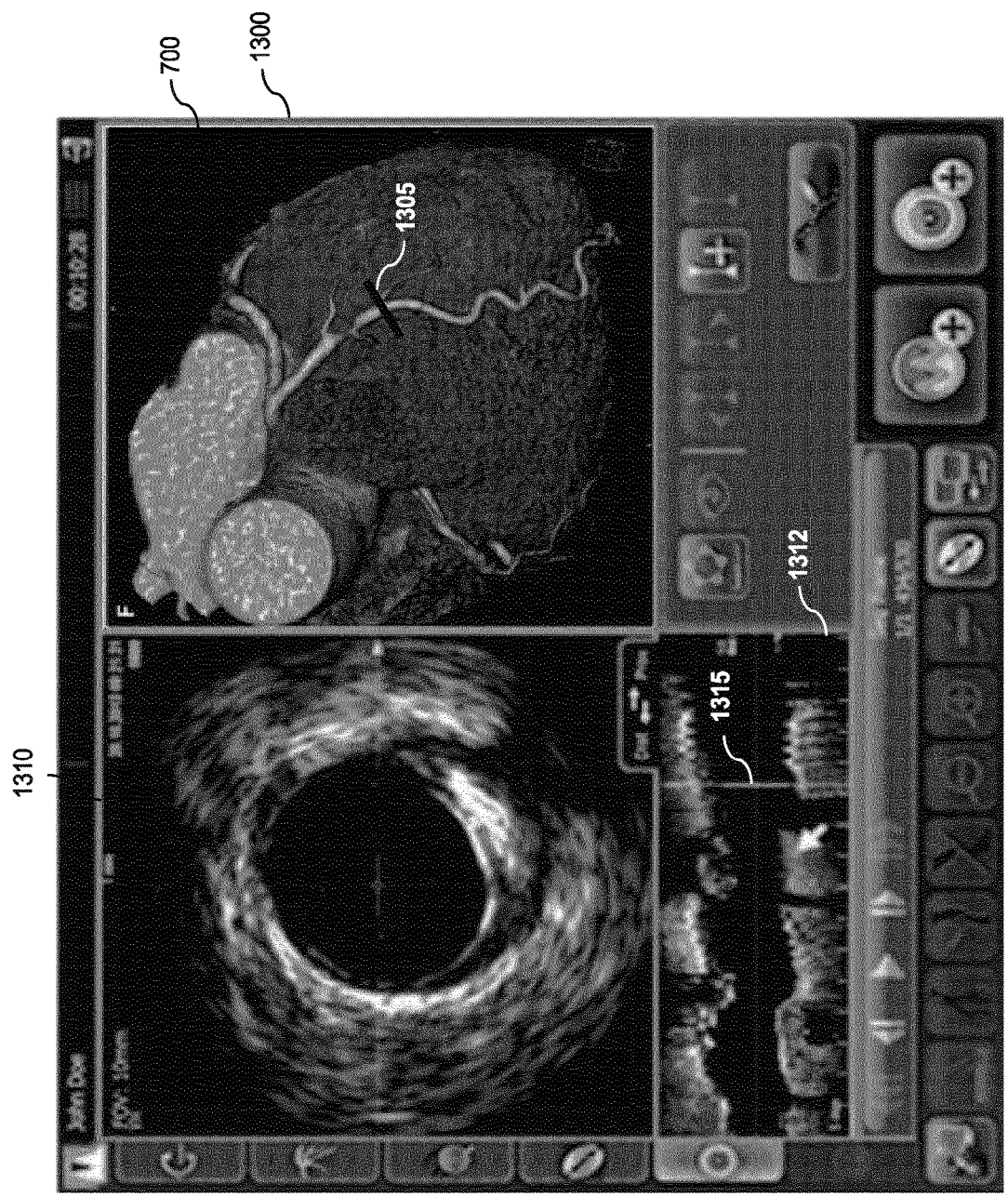
FIG. 13 is a diagrammatic view of a graphical user interface displaying intravascular data co-registered to a CT-based 3D model, according to aspects of the present disclosure.

At step 645, the method 600 includes displaying the CT-based model 700 with a visual representation 1310 of the intravascular data 1230. Step 645 will be described with reference to FIGS. 13 and 14. FIG. 13 is a diagrammatic view of a graphical user interface 1400 displaying intravascular data 1310 coregistered to the CT-based 3D model 700, according to aspects of the present disclosure. FIG. 13 additionally depicts an indicator 1315, an image longitudinal display (ILD) 1312, and an indicator 1305.

The CT-based model 700 with co-registered intravascular data 1310 may be displayed to a user in any suitable format. For example, as shown in FIG. 13, the CT-based model 700 may be displayed adjacent to the corresponding intravascular data 1310. The intravascular data 1310 may be an IVUS image. In other embodiments, co-registered intravascular data may include any other suitable images, metrics, or other data and may be overlaid over the CT-based model 700 or arranged or displayed in any other suitable configuration.

In the embodiment shown in FIG. 13, the indicator 1305 is positioned over the CT-based three-dimensional model 700 at a location along a vessel imaged by the intravascular device 1220 (FIG. 12). The IVUS image 1310 displayed adjacent to the CT-based model 700 is an image acquired by the intravascular device at the location identified by the indicator 1305. For example, the location identified by the indicator 1305 may correspond to the location 1241 previously identified in FIG. 12. The fluoroscopy image 1210 and IVUS image 1230 shown in FIG. 12 may be associated with the location 1241 on the angiography-based model 900 in FIG. 12. This same location 1241 and its associated IVUS image(s) and/or fluoroscopy image(s) may then be mapped to the CT-based model 700 with the feature mapping generated as described with reference to FIG. 10. This allows the IVUS image obtained at the location 1241 to be displayed alongside the three-dimensional CT-based model 700 indicating the location 1241 at which the IVUS image was obtained via the indicator 1305. In some embodiments, a user of the system 100 may also select an additional IVUS image to be displayed in the graphical user interface 1300. As a different IVUS image is selected, the indicator 1305 would move to a different location along the vessel corresponding to the location at which the selected IVUS image was obtained. In some embodiments, a user of the system 100 may additionally move the indicator 1305 along any vessel shown in the CT-based model 700 and an IVUS image corresponding to the selected location would be displayed to the user if an IVUS image is available.

In some embodiments, additional images may be included and displayed to a user of the system 100, including the image longitudinal display (ILD) 1312. The ILD 1312 may provide the user with a longitudinal view of the vessel imaged with the intravascular device. Specifically, one end of the ILD 1312 may correspond to the proximal most region of the imaged vessel and the opposing end of the ILD 1312 may correspond to the distal most region of the imaged vessel. The ILD 1312 may provide a visual representation (e.g., numerical/alphanumerical, graphical, symbolic, etc.) of relative diameters of the imaged vessel at all positions along the imaged vessel. The ILD 1312 may include an indicator 1315. The indicator 1315 may correspond to the position of the intravascular device relative to the entire imaged vessel at the location at which the displayed IVUS image was obtained. In this way, as the indicator 1305 is moved by a user to a different location along the vessel, a different IVUS image would be displayed adjacent to the CT-based model 700 and the indicator 1315 would also move to a different corresponding position within the ILD 1312. In some embodiments, a user may be able to move the indicator 1315 to a different location within the ILD 1312 as well and cause the system 100 to recall and display an associated IVUS image as well as move the indicator 1305 to a different corresponding position within the CT-based model 700.

The system 100 may display additional images or metrics to a user. For example, the system 100 may display any of the previously discussed images such as the fluoroscopy images 1210, the two-dimensional path 1240, the three-dimensional path 1250, the angiography-based model 900 (FIG. 12), or the angiography images 805 (FIG. 8A) and 810 (FIG. 8B). The system 100 may additionally display any suitable indicators or metrics associated with any of these images.

Figure 14:
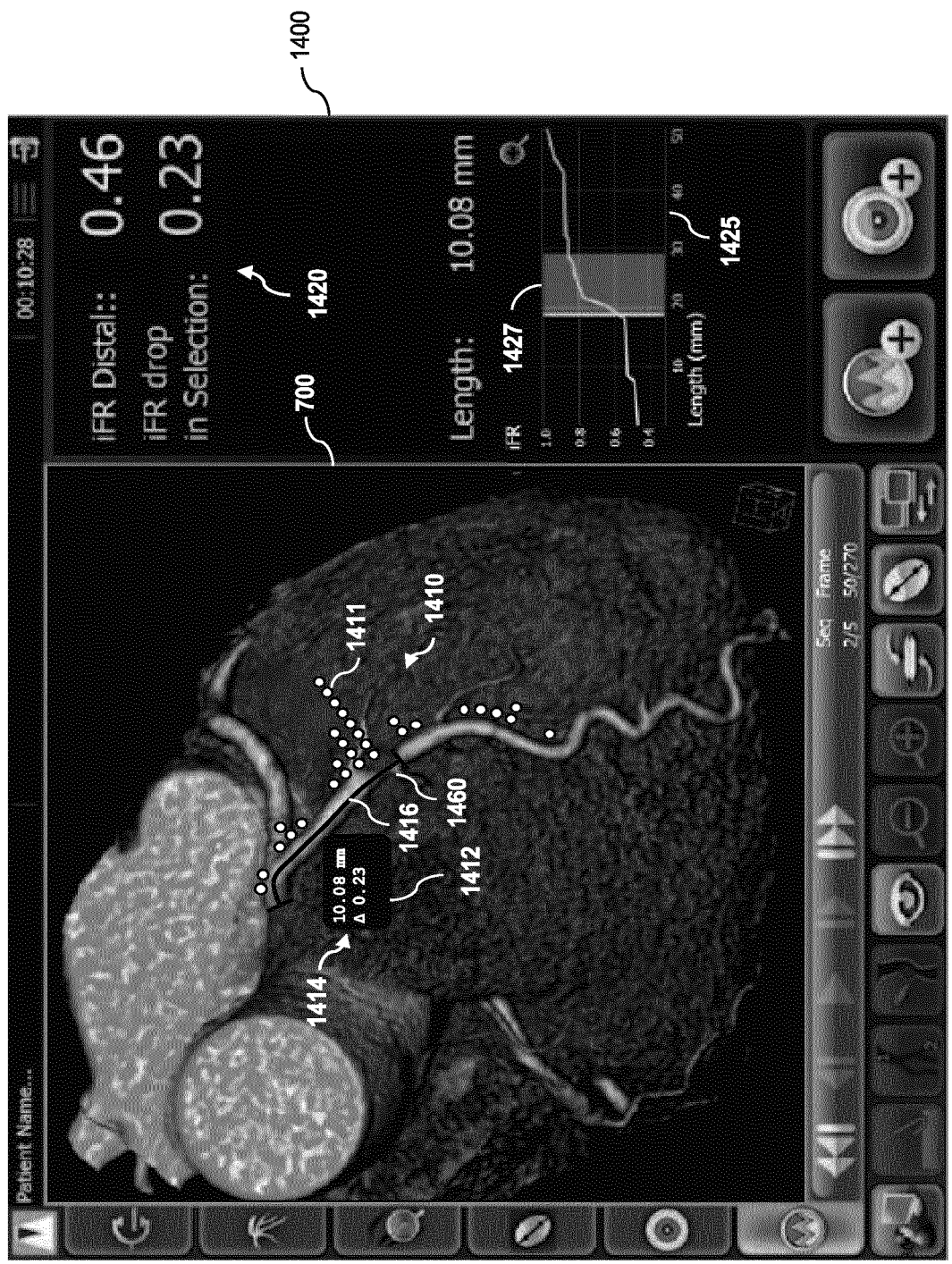
FIG. 14 is a diagrammatic view of a graphical user interface displaying intravascular data co-registered to a CT-based 3D model, according to aspects of the present disclosure.

FIG. 14 is a diagrammatic view of a graphical user interface 1400 displaying intravascular data 1410 co-registered to the CT-based 3D model 700, according to aspects of the present disclosure. In the example graphical user interface 1400 shown in FIG. 14, the intravascular data 1410 may correspond to intravascular data other than IVUS data. For example, the intravascular 1410 may correspond to iFR data, but in other embodiments, the intravascular data may alternatively correspond to FFR data, or any other suitable intravascular data. The intravascular data 1410 includes pressure difference indicators 1411, an indicator 1416, pressure metrics 1420, a chart 1425, a region 1427, a visual element 1412, and metrics 1414.

As shown in FIG. 14, visual representations (e.g., numerical/alphanumerical, graphical, symbolic, etc.) corresponding to intravascular data 1410 may be overlaid over the CT-based model 700. In other embodiments, intravascular data 1410 may be displayed adjacent to the CT-based model 700 or in any other configuration. In the embodiment shown in FIG. 14, the intravascular data 1410 includes multiple pressure difference indicators 1411. The pressure difference indicators 1411 may convey to a user the severity of differences in pressure at various locations along the measured vessel. For example, each symbol can be representative of a unit change in the pressure ratio (e.g., 0.01 change in iFR). Accordingly, the number of indicators 1411 may correspond to the severity of pressure difference. For instance, near an occlusion 1460, the difference in pressure may be the most significant. The greatest number of indicators 1411 may then be positioned by the location of the occlusion 1460. In the embodiment shown, the indicators 1411 may be positioned extending in a straight line perpendicular to the vessel. However, the pressure difference indicators 1411 may be arranged in any suitable manner. For example, they may not extend in a straight line, but may extend in any angled or curvilinear line. The indicators 1411 may also be arranged according to any suitable arrangement or pattern which may convey to a user any suitable metric associated with the vessel at a particular location. Although the pressure difference indicators 1411 are of a circular shape in FIG. 14, the indicators 1411 may be of any suitable type. For example, they may be of any suitable geometric or non-geometric shape or size or may be or include any suitable alphanumeric characters.

The chart 1425 adjacent to the CT-based model 700 may indicate intravascular pressure at all locations along the measured length of the vessel. For example, an x-axis of the chart 1425 may indicate the distance of locations along the vessel from the most distal or most proximal position within the vessel at which intravascular measurements were obtained. A y-axis of the chart 1425 may indicate the quantity of intravascular measurement, in this case, iFR measurement data. In some embodiments, a user of the system 100 may select a region 1427 within the chart 1425. The region 1427 corresponds to a length of the measured vessel. The region 1427 may additionally correspond to the indicator 1416 overlaid on the CT-based model 700. The indicator 1416 illustrates the same selected length of vessel on the CT-based model 700. In some embodiments, the selected length may be selected by the user either on the CT-based model 700 or on the chart 1425.

Upon selection of a region 1427 and/or length shown by the indicator 1416, the system 100 may generate and display one or more metrics associated with the selected length of vessel. For example, the metrics 1420 may include metrics such as iFR or other measurements relating to a drop or change in pressure across the selected region 1427. Any additional metrics may also be displayed, such as pressure data related to the distal most location within the selected region 1427, the proximal most location, an average pressure metric, or any other suitable metrics. The metrics 1420 may additionally include pressure or other intravascular data related to the measured vessel such as an iFR measurement at the distal most measured position of the vessel. The metrics 1420 may additionally include any other suitable intravascular data metrics, such as average pressure or iFR measurements along the entire measured portion of the vessel, change in pressure or iFR measurements along the entire measured portion of the vessel, or any other suitable metrics. The metrics 1420 may be displayed in any suitable location within the graphical user interface, including overlaid on the CT-based model 700, adjacent to or near the CT-based model 700, overlaid on the chart 1425, or adjacent to or near the chart 1425, or at any other position suitable and in any other suitable arrangement, orientation, or organization.

Upon selection of a region 1427 and/or length shown by the indicator 1416, the system 100 may also generate the visual element 1412. The visual element 1412 may display the same, similar, or different metrics associated with the selected region 1427. The metrics 1414 shown within the visual element 1412 may indicate the length of the selected region 1427 and the change or drop in pressure or iFR measurements along the selected region 1427. The metrics 1414 may additionally or alternatively include any other suitable metrics including any of those listed with reference to metrics 1420. Similar to the metrics 1420, the metrics 1414 may be displayed in any suitable location within the graphical user interface, including overlaid on the CT-based model 700, adjacent to or near the CT-based model 700, overlaid on the chart 1425, or adjacent to or near the chart 1425, or at any other suitable position and in any other suitable arrangement, orientation, or organization.

Figure 15:
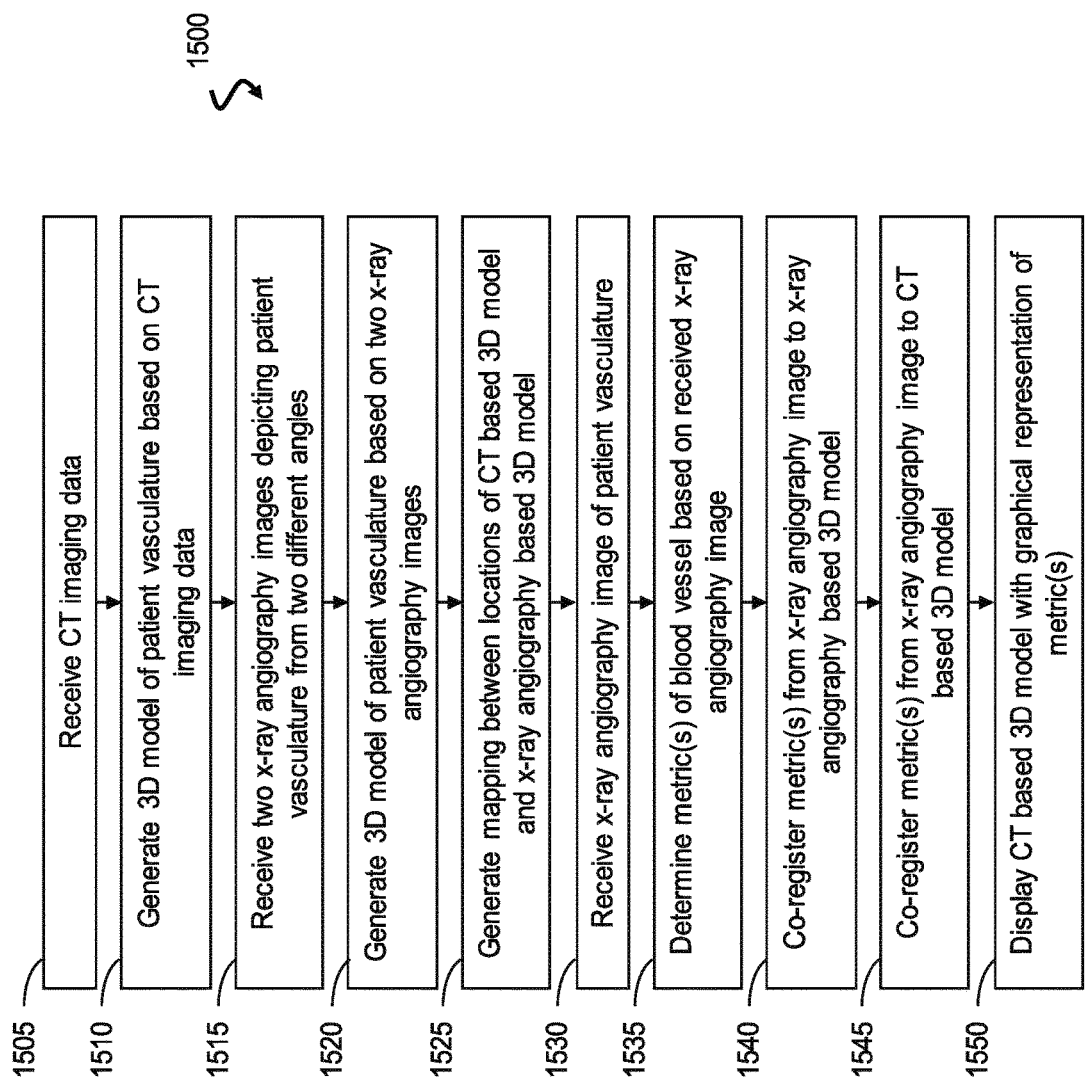
FIG. 15 is a flow diagram of a method of co-registering angiography-based data with a CT-based 3D model, according to aspects of the present disclosure.

FIG. 15 is a flow diagram of a method 1500 of co-registering angiography-based data with a CT-based 3D model, according to aspects of the present disclosure. One or more steps of the method 1500 will be described with reference to FIGS. 16-19. As illustrated, the method 1500 includes a number of enumerated steps, but embodiments of the method 1500 may include additional steps before, after, or in between the enumerated steps. In some embodiments, one or more of the enumerated steps may be omitted, performed in a different order, or performed concurrently. The steps of the method 1500 can be carried out by any suitable component within the imaging system 100 and all steps need not be carried out by the same component. In some embodiments, one or more steps of the method 1500 can be performed by, or at the direction of, a processor circuit of the imaging system 100, including, e.g., the processor 560 (FIG. 5) or any other component. The angiography-based data described with reference to FIG. 15 and the method 1500 may be any suitable form of data that is derived from or mapped to an x-ray angiography image. For example, such angiography-based data could include QCA data, angiography-based pressure ratio data (e.g., angio Pd/Pa, angio FFR, angio iFR, etc.), angiography-based functional data (e.g., angio pressure and/or angio flow), or any other suitable data. For example, other data types include vascular perfusion data (e.g., myocardial perfusion imaging) with single photon emission computed tomography (SPECT) or positron emission tomography (PET).

Steps 1505-1525 may be substantially similar to steps 605-625 of the method 600 (FIG. 6). For example, at step 1505, the method 1500 includes receiving CT imaging data. The CT imaging data may be the same CT imaging data received at step 605 or may differ according to the patient anatomy imaged.

At step 1510, the method 1500 includes generating a 3D model 1705 (FIG. 17) of the patient's vasculature based on the CT imaging data. The CT-based three-dimensional model 1705 may be the same CT-based model 700 (FIG. 7) or may differ. The CT-based model 1705 may be generated based on CT imaging data corresponding to a different patient anatomy or different imaging procedure.

At step 1515, the method 1500 includes receiving two angiography images depicting the patient vasculature from two different angles. The received angiography images may be the same angiography images 805 (FIG. 8A) and 810 (FIG. 8B) received at step 615 of the method 600 or may differ. Just as the angiography images 805 and 810, the two received angiography images must be acquired at two different known angles relative to the patient anatomy. A contrast agent may be introduced to the vasculature before the angiography images are obtained.

At step 1520, the method 1500 includes generating a three-dimensional model 1700 (FIG. 17) of the patient vasculature based on the two x-ray angiography images. The three-dimensional model 1700 may be the same model as the angiography-based 3D model 900 generated at step 620 of the method 600 or may differ based on the patient anatomy imaged or the procedure. The angiography-based 3D model 1700 may be generated using the same two-dimensional to three-dimensional matrix projection or matrix transformation techniques described with reference to step 620.

At step 1525, the method 1500 includes generating a mapping between locations of the CT-based 3D model 1705 and the x-ray angiography-based 3D model 1700. The feature mapping established between the CT-based model 1705 and the angiography-based model 1700 may be the same or substantially similar to the feature mapping created between the CT-based model 700 and the angiography-based model 900 described with reference to FIG. 10. If alternative imaging data is obtained to generate the CT-based model 1705 and the angiography-based model 1700 different from the CT-based model 700 and the angiography-based model 900, the feature mapping between the two will differ as well. However, the feature mapping may be generated in a similar way. For example, the system 100 may identify multiple landmark features within both models 1700 and 1705 and establish a mapping correspondence between the two. The system 100 may additionally establish a mapping correspondence between some, all, or most points in both models 1700 and 1705 using methods described with reference to FIGS. 11A-11D or similar methods.

At step 1530, the method 1500 includes receiving an x-ray angiography image 1600 of the patient vasculature. Step 1530 of the method 1500 may differ from step 630 of the method 600. Step 1530 will be described with reference to FIG. 16, which is a diagrammatic view of an x-ray angiography image 1600 with angiography-based data 1650, according to aspects of the present disclosure. The x-ray angiography image 1600 may be obtained via the x-ray imaging device 300 (FIG. 3) or the x-ray angiography imaging device 156 in conjunction with the x-ray angiography processing system 154 (FIG. 1) previously described or with any other similar device and processing system. The x-ray angiography image 1600 may correspond to an anatomy of any suitable region or structure of a patient anatomy including any of the previously mentioned parts of a patient anatomy. The patient anatomy imaged in the x-ray angiography image 1600 may be the same anatomy imaged in the CT data and the angiography images used to create the CT-based model 1705 and the angiography-based model 1700 respectively. A contrast agent may be introduced to the patient vasculature prior to obtaining the angiography image 1600. The x-ray angiography image 1600 may be acquired at any suitable angle with respect to the patient anatomy. The two angiography images used to create the angiography-based model 1700 are obtained at two different angles. The angle of the angiography image 1600 need not be at the same angle as either of these angles but it may be. In some embodiments, the x-ray angiography image 1600 may be the same image as one of the two angiography images used to create the angiography-based model 1700. For example, the x-ray angiography image 1600 may be the same image as the angiography images 805 (FIG. 8A) or 810 (FIG. 8B) or may differ. The angle at which the x-ray angiography image 1600 was obtained must be known.

Figure 16:
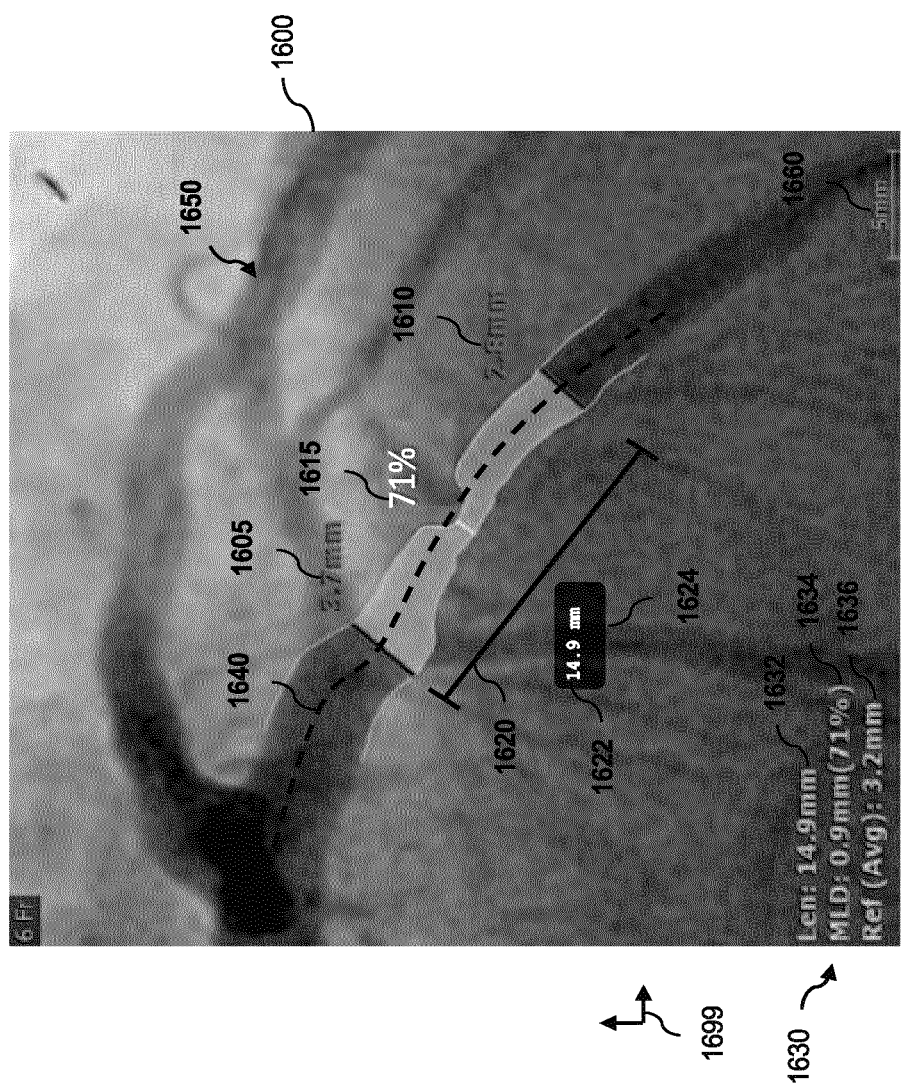
FIG. 16 is a diagrammatic view of an x-ray angiography image with angiography-based data, according to aspects of the present disclosure.

At step 1535, the method 1500 includes determining metrics 1650 of blood vessels within the patient vasculature based on the received x-ray angiography image. Step 1535 will also be described with reference to FIG. 16. FIG. 16 depicts angiography-based data 1650 overlaid on the angiography image 1600. The angiography-based data 1650 includes lumen diameters 1605 and 1610, a minimum lumen diameter (MLD) value 1615, a length 1620, a length measurement 1622, a visual element 1624, a scale 1660, and additional metrics 1630. The additional metrics 1630 include an additional length measurement 1632, MLD data 1634, and an average lumen diameter 1636. As previously mentioned, the angiography-based data 1650 may include any suitable angiography image-based data, including QCA data or any other suitable type of data. The axes 1699 denote that the angiography image 1600 is two-dimensional.

In some embodiments, a user of the system 100 may select a region or length 1620 along an imaged vessel as shown in FIG. 16. In some embodiments, the system 100 may select the length 1620 automatically using any of the previously mentioned image processing or artificial intelligence techniques. In some embodiments, the length 1620 may include multiple vessels within the angiography image 1600 including any suitable landmark features previously described including bifurcations, occlusions, regions of tortuosity, lengths, or other landmark features.

Upon the selection of the length 1620, multiple angiography-based data 1650 may be determined. For example, at a proximal end of the selected length 1620, the lumen diameter 1605 may be determined. At a distal end of the selected length 1620, the lumen diameter 1610 may also be determined. The diameters 1605 and/or 1610 may additionally be referred to as reference diameters. The diameters 1605 and/or 1610 can be representative of relatively more healthy diameters proximal or distal to an occlusion therebetween.

In some embodiments, the selected length 1620 of an imaged vessel may include an occlusion as shown in FIG. 16. The system 100 may identify the position of the occlusion and determine the MLD value 1615. The MLD value may correspond to the severity of the identified occlusion. The MLD value may be a percentage, as shown, or may additionally be a length measurement similar to the diameters 1605 and 1610 or may be any other type of metric to illustrate the severity of the occlusion. The MLD 1615 may be a percentage of occlusion. In some embodiments, a percentage value of MLD at the identified occlusion may be calculated based on the lumen diameter at the occlusion divided by an average of the diameters 1605 and 1610. In some embodiments, an MLD value 1615 may be calculated by the system 100 after any length 1620 is selected whether or not an occlusion is identified. The MLD value 1615 may assist a physician in determining the proper treatment of occlusions within the vasculature. For example, the MLD value 1615 may provide information relating to the type or size of stent to be placed within the patient vasculature.

The system 100 may also determine a length measurement 1622 of the selected length 1620. In an embodiment in which the angiography-based data 1650 is displayed to a user within the angiography image 1600 as shown in FIG. 16, the length measurement 1622 may be positioned within a visual element 1624 near the length 1620 or an indicator of the length 1620. The length measurement 1622 may also be positioned elsewhere. The visual element 1624 may be in any suitable position, however. For example, the visual element 1624 may be positioned above, beneath, beside, or otherwise adjacent to the angiography image 1600. In addition, the visual element 1624 may be of any suitable shape, type, color, opacity, or orientation. The visual element 1624 may be or include any suitable symbol, graphical representation, or alpha-numeric characters. The visual element 1624 may include any suitable metrics or angiograph-based data 1650 in addition to the length measurement 1622 shown.

The angiography-based data 1650 may additionally include the scale 1660. The scale 1660 may be positioned at any suitable location within the angiography image 1600 and may indicate to a user the scale of the image 1600. For example, the scale 1660 may display an exemplary length measurement in conjunction with a visual element displaying how a structure of that exemplary length may appear within the angiography image 1600.

The angiography-based data 1650 may also include any suitable additional metrics 1630. The length measurement 1632 may correlate to the length measurement 1622 previously described but may be included at a different location within the image 1600. In some embodiments, the length measurement 1632 may also correspond to a different length of the vasculature within the image 1600, such as the total length of vasculature shown, a previously selected length 1620, or any other suitable length.

The MLD data 1634 may include any information relating to an occlusion shown within the angiography image 1600 or along the selected length 1620 or any other location of minimum lumen diameter. The MLD data 1634 may include the MLD value 1615 previously discussed or may include additional values, percentages, or metrics. The MLD data 1634 may include a measured diameter of the lumen at a location of minimum diameter.

The average lumen diameter 1636 may also be included within the additional metrics 1630. The average lumen diameter 1636 may correspond to an average of the two lumen diameters 1605 and 1610 previously discussed. The average lumen diameter 1636 may also correspond to an average of all lumen diameters along the selected length 1620, may correspond to an average of all the diameters of lumens shown in the angiography image 1600, or may include some other statistical metric relating to the angiography-based data 1650 shown.

Any suitable additional metrics may be measured and determined in addition to or included with the angiography-based data 1650 described with reference to FIG. 16. The system 100 may also calculate other metrics based on the metrics shown, such as metrics related to blood pressure, blood flow, bifurcations, regions of tortuosity, vessel trauma, scarring, or any other suitable metrics. In some embodiments, any or all of the previously mentioned metrics may be calculated without a user or the system 100 selecting a region of length 1620. Any of the mentioned angiography-based data 1650 may be determined for vessels observed within the image as a whole or in part. In some embodiments, the metrics discussed may be calculated, but not displayed to a user. In addition, the angiography image 1600 may not be displayed to a user. Rather, the angiography-based data 1650 may be calculated by the system 100 and stored within a memory. The angiography-based data 1650 may also be displayed to a user overlaid on or in conjunction with images or models different from the angiography image 1600.

Any or all of the previously mentioned angiography-based data 1650 may be calculated through any suitable method. For example, the data may be determined via image processing or artificial intelligence techniques. The data may be determined using edge detection techniques to identify the locations and borders of vessels within the angiography image 1600. The system 100 may additionally use any suitable optimization, calibration, or validation methods to identify features or structures of interest within the angiography image 1600.

Figure 17:
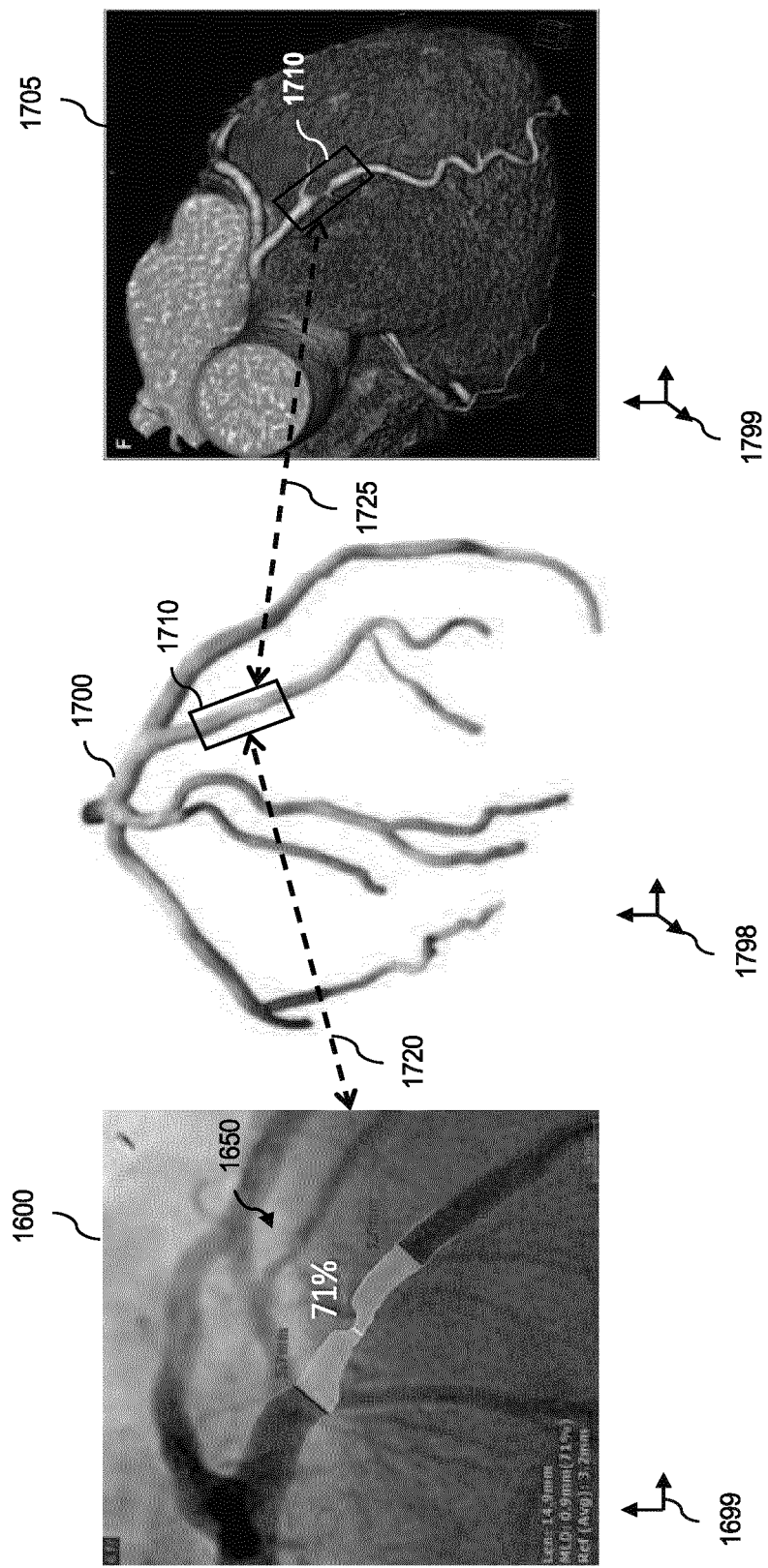
FIG. 17 is a diagrammatic view of a relationship between an x-ray angiography image with angiography-based data, an x-ray angiography-based model, and a CT-based 3D model, according to aspects of the present disclosure.

At step 1540, the method 1500 includes co-registering the determined angiography-based data 1650 from the x-ray angiography image 1600 to the x-ray angiography-based 3D model 1700. The step 1540 will be described with reference to FIG. 17, which is a schematic diagram illustrating a relationship between the x-ray angiography image 1600 with angiography-based data 1650, an x-ray angiography-based model 1700, and a CT-based model 1705, according to aspects of the present disclosure. FIG. 17 shows the angiography image 1600 along with angiography-based data 1650, the angiography-based model 1700 identifying a region 1710, the CT-based model 1705 identifying the same region 1710, and arrows 1720 and 1725 showing a mapping correspondence between the angiography image 1600, the angiography-based model 1700, and the CT-based model 1705.

The vessels shown in the angiography image 1600 may be identified with any of the previously mentioned image processing or artificial intelligence methods. These identified vessels may then be used to generate a two-dimensional model or a two-dimensional path 1640 similar to the two-dimensional path 1240 described with reference to FIG. 12. The two-dimensional model may show the patient vasculature from the angle at which the angiography image 1600 was acquired.

As discussed, any suitable part of a vessel, or region of a vessel may have associated with it multiple angiography-based data 1650 including lumen diameter, percentages of occlusion, metrics related to blood pressure, flow, or any other metrics.

This data 1650 may be co-registered to the angiography-based model 1700. The two-dimensional model based on the vessels shown in the angiography image 1600 may be projected onto the three-dimensional angiography-based model 1700. This projection can be similar to step 635 (FIG. 6), described above. Because the angle at which the angiography image 1600 is known, this same angle may be used according to the same or similar mathematical processes relating to matrix projection and transformation previously presented with reference to FIG. 9 to project the two-dimensional model from the angiography image 1600 onto the angiography-based three-dimensional model 1700 as shown in FIG. 17. Just as different fluoroscopy images 1210 and intravascular data 1230 were associated with various locations along the projected three-dimensional path 1250 of the model 900 as shown in FIG. 12, the angiography-based data 1650 may be associated with the their respective locations along the vessels of the angiography-based three-dimensional model 1700 as shown by the arrow 1720. For example, the region 1710 shown in the model 1700 may correspond to the selected length 1620 of FIG. 16. In this way, just as the proximal lumen diameter 1605 was associated with the proximal most location along the selected length 1620 in FIG. 16, the same diameter 1605 may be associated with the same location at the proximal most location of the region 1710 on the three-dimensional angiography-based model 1700.

In some embodiments, a two-dimensional model based on the vessels shown in the angiography image 1600 need not be generated by the system 100. Rather, the locations of the vessels shown in the angiography image 1600 may be directly projected to the three-dimensional angiography-based model 1700 using the same or similar matrix projection techniques previously described. The angiography-based data 1650 may additionally be directly associated with the three-dimensional model 1700 without generating a two-dimensional model, as shown by the arrow 1720. The axes 1798 denote that the model 1700 is three-dimensional and the axes 1799 denote that the model 1705 is three-dimensional.

At step 1545, the method 1500 includes co-registering the determined metrics from the x-ray angiography image to the CT-based 3D model. The step 1545 will also be described with reference to FIG. 17. As illustrated in FIG. 17 and described in steps 1535 and 1540, the angiography-based three-dimensional model 1700 may include all of the angiography-based data 1650 obtained at step 1535. In other words, each position of the three-dimensional model 1700 may have associated angiography-based data 1650. Using the feature mapping generated at step 1525 which links locations within the angiography-based model 1700 and the CT-based model 1705, the same angiography-based data 1650 associated with positions along the three-dimensional model 1700 may be associated with the same positions on the CT-based three-dimensional model 1705.

Figure 18:
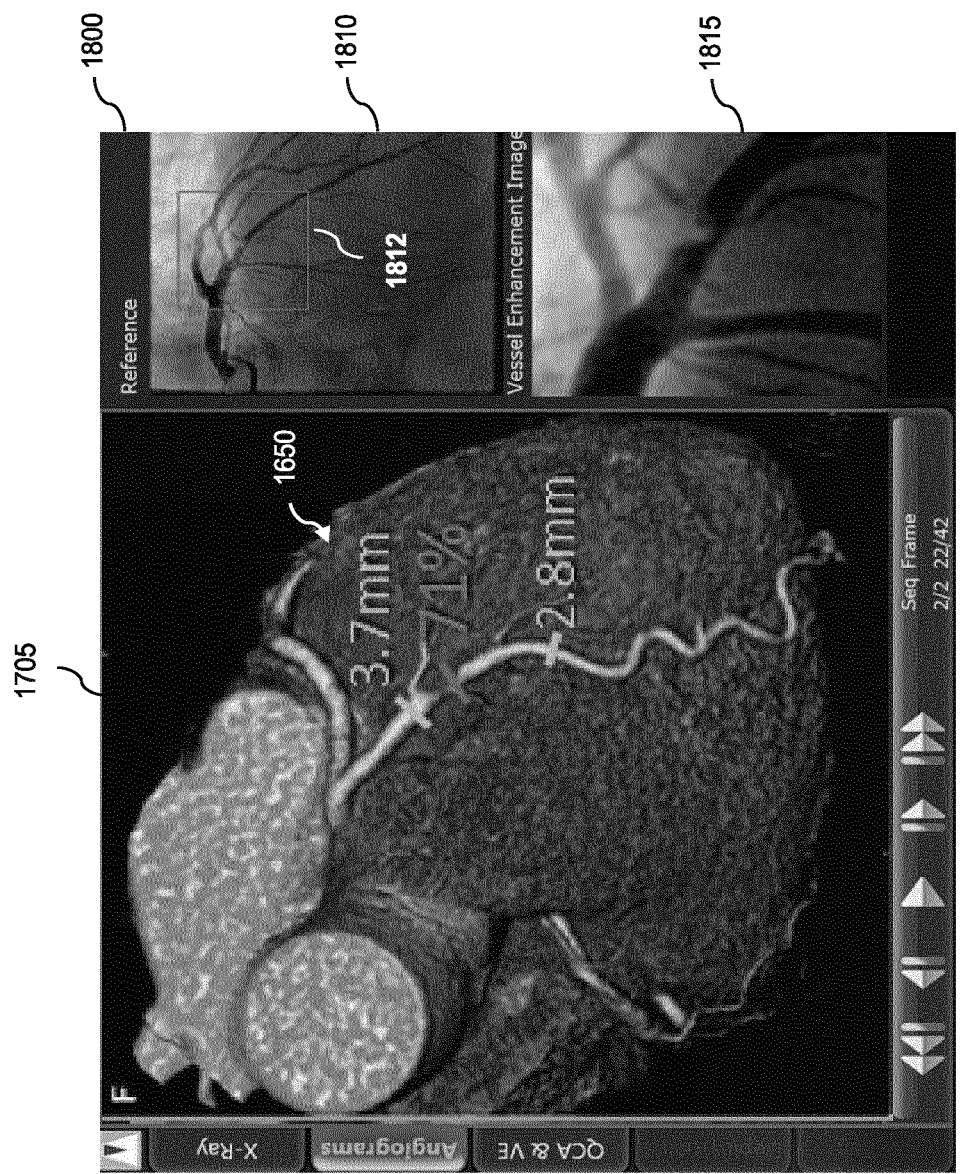
FIG. 18 is a diagrammatic view of a graphical user interface displaying angiography-based data co-registered to a CT-based 3D model, according to aspects of the present disclosure.

At step 1550, the method 1500 includes displaying the CT-based 3D model 1705 with a visual representation of the determined metrics 1650 from the x-ray angiography image 1600. Step 1550 will be described with reference to FIGS. 18 and 19. FIG. 18 is a diagrammatic view of a graphical user interface 1800 displaying angiography-based data 1650 co-registered to the CT-based 3D model 1705, according to aspects of the present disclosure. FIG. 18 additionally depicts a view 1810 of the angiography image 1810, an enlarged view 1815 of the angiography image 1810, and an indicator 1812.

The CT-based model 1705 with co-registered angiography-based data 1650 may be displayed to a user in any suitable format. For example, as shown in FIG. 18, the angiography-based data 1650 may be displayed overlaid on the CT-based model 1705. The angiography-based data 1650 may be QCA data. In other embodiments, co-registered angiography-based data 1650 may include any other suitable images, metrics, or other data. The co-registered angiography-based data 1650 may also be positioned beside the CT-based model 1705 or arranged or displayed in any other suitable configuration.

In the embodiment shown in FIG. 18, the angiography-based data 1650 determined at step 1535 and shown in FIG. 16 in more detail is positioned overlaid on the CT-based model 1705. As shown, the amount, type, or form of display of the data 1650 may differ from FIG. 16. In some embodiments, a user of the system 100 may specify which data 1650 to view on the graphical user interface 1800. In some embodiments, all angiography-based data 1650 displayed in FIG. 16 may also be included within the graphical user interface 1800 shown in FIG. 18.

Adjacent to the CT-based model 1705, an angiography image 1810 is shown. The angiography image 1810 may be the same image as the angiography image 1600, either of the two angiography images used to create the angiography-based model 1700, the angiography images 805 (FIG. 8A) or 810 (FIG. 8B), or any other angiography image. In some embodiments, a physician may obtain additional angiography images during an x-ray angiography procedure. Any of these images may be displayed adjacent to, or otherwise in conjunction with the CT-based model 1705. The angiography image 1810 may correspond to a view or angle of the CT-based model 1705 as displayed to the user or may differ. In some embodiments, the system 100 may additionally display an enlarged portion 1815 of the angiography image 1810. The enlarged portion 1815 of the angiography image 1810 may assist a user to observe landmark features or other features of interest within the angiography image 1810. The indicator 1812 may convey to a user the section of the angiography image 1810 corresponding to the enlarged portion 1815. In some embodiments, a user of the system 100 may select the section of the angiography image 1810 to be displayed by creating the indicator 1812 within the image 1810 with any suitable command input device, such as computer mouse, keyboard, touchscreen, or any other suitable device. In some embodiments, the graphical user interface 1800 may additionally or alternatively include an enlarged view of the CT-based model 1705. In some embodiments, the metrics 1650 may additionally be displayed on the angiography image 1810, the enlarged portion 1815 of the angiography image 1810, or the enlarged portion of the CT-based model 1705.

Figure 19:
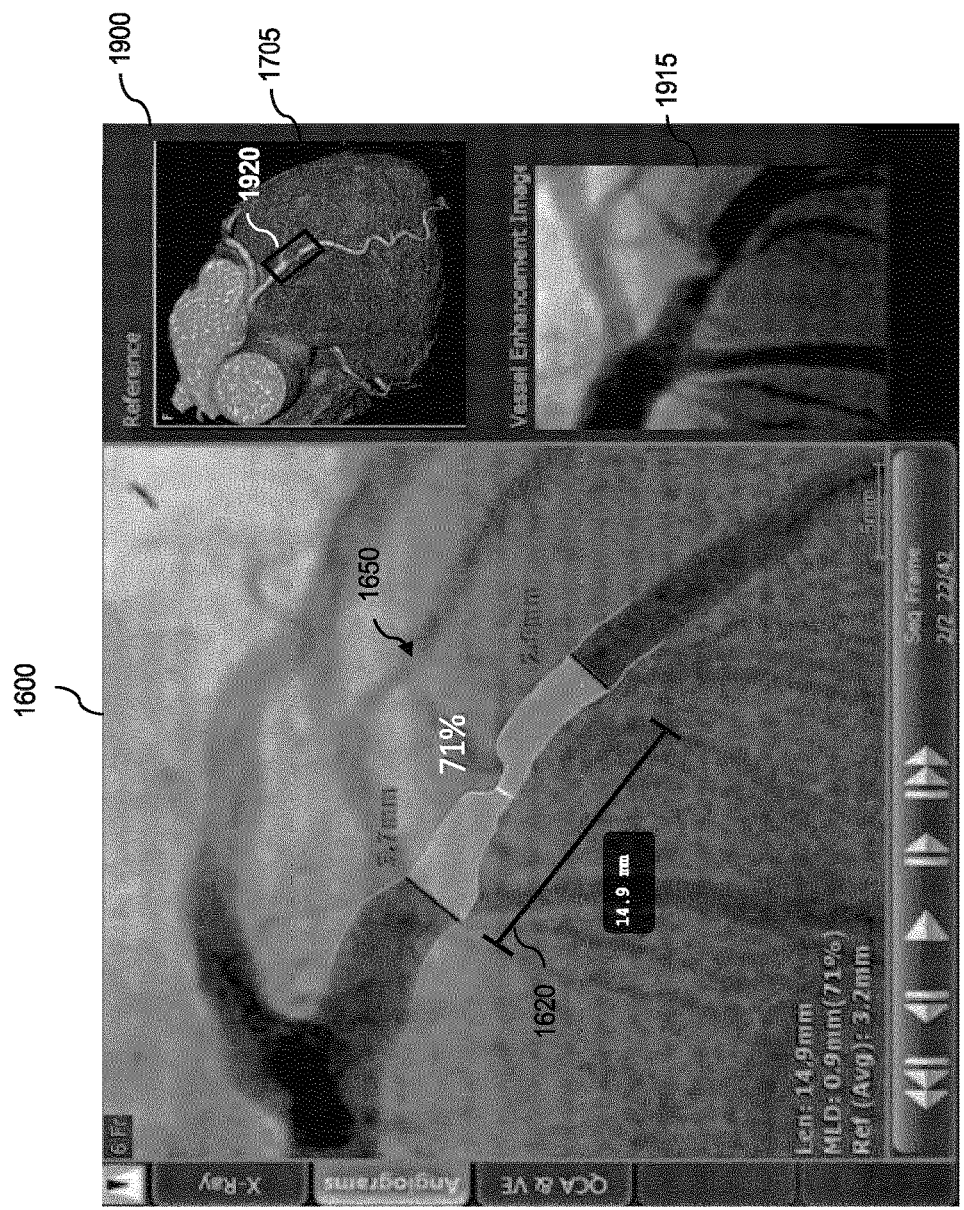
FIG. 19 is a diagrammatic view of a graphical user interface displaying angiography-based data co-registered to a CT-based 3D model, according to aspects of the present disclosure.

FIG. 19 is a diagrammatic view of a graphical user interface 1900 displaying angiography-based data 1650 co-registered to the CT-based 3D model 1705, according to aspects of the present disclosure. FIG. 19 includes the angiography image 1600, angiography-based data 1650, the CT-based model 1705, a region 1920, and an enlarged portion 1915 of the angiography image 1600.

An additional exemplary graphical user interface 1900 may display the angiograph-based data 1650 overlaid on the original angiography image 1600 used to calculate the angiography-based data 1650 at step 1535. In other embodiments, the angiography image 1600 may be a different angiography image including any listed with reference to FIG. 18. In some embodiments, a user of the system 100 may select any angiography image to be displayed within the graphical user interface 1900 and the system 100 may overlay the angiography-based data 1650 on the selected angiography image. The angiography data 1650 may be arranged on or beside the angiography image 1600 in any suitable configuration or arrangement and may be of any suitable form or type as described with reference to FIG. 16.

The CT-based model 1705 may be displayed in conjunction with the angiography image 1600. For example, as shown in FIG. 19, it may be positioned adjacent to the angiography image 1600. In some embodiments, the angiography-based data 1650 may additionally be overlaid on the CT-based model 1705. In other embodiments, the region 1920 may be overlaid over the CT-based model 1705. The region 1920 may indicate the location within the CT-based model 1705 of the selected length 1620 discussed with reference to FIG. 16. In some embodiments, the region 1920 may instead correlate to the region shown by the angiography image 1600 as a whole within the CT-based model 1705.

The system 100 may additionally display an enlarged portion 1915 of the angiography image 1600. The enlarged portion 1915 of the angiography image 1600 may assist a user to observe landmark features or other features of interest within the angiography image 1600 in more detail. In some embodiments, an indicator may be included within the angiography image 1600 to convey to a user the section of the angiography image 1600 corresponding to the enlarged portion 1915. In some embodiments, a user of the system 100 may select the section of the angiography image 1600 to be displayed by creating the indicator within the image 1600. In some embodiments, the graphical user interface 1900 may additionally or alternatively include an enlarged view of the CT-based 3D model 1705. In some embodiments, the metrics 1650 may additionally be displayed on the enlarged portion 1915 of the angiography image 1600, or the enlarged portion of the CT-based model 1705.

It is understood that the data, metrics, features, graphical elements, visual representations, images, or any other aspects of the graphical user interfaces 1800 (FIG. 18) and/or 1900 are merely exemplary and any other additional data, metrics, features, graphical elements, visual representations, images, or any other aspects are fully contemplated. In addition, the arrangement of the elements listed above is also exemplary. Any suitable configuration, arrangement, or organization is also fully contemplated.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A co-registration system, comprising:
a processor circuit configured for communication with a display, an x-ray fluoroscopy device, and an intravascular catheter or guidewire, wherein the processor circuit is configured to:
determine a mapping between corresponding locations of a computed tomography (CT)-based three-dimensional (3D) model of a blood vessel and an x-ray angiography-based 3D model of the blood vessel;
receive, from the x-ray fluoroscopy device, a plurality of x-ray fluoroscopy images of the blood vessel while the intravascular catheter or guidewire moves through the blood vessel;
receive, from the intravascular catheter or guidewire, intravascular data representative of the blood vessel while the intravascular catheter or guidewire moves through the blood vessel;
co-register the intravascular data to the x-ray angiography-based 3D model based on the plurality of x-ray fluoroscopy images;
co-register the intravascular data to the CT-based 3D model based on the mapping such that the intravascular data is indirectly co-registered to the CT-based 3D model using the x-ray angiography-based 3D model; and
output, to the display, the CT-based 3D model and a visual representation of the intravascular data overlaid on the CT-based 3D model.

2. The system of claim 1, wherein the processor circuit is configured to associate same anatomical features of the blood vessel in the CT-based 3D model and the an x-ray angiography-based 3D model to determine the mapping.

3. The system of claim 1,
wherein the plurality of x-ray fluoroscopy images comprise two-dimensional (2D) images,
wherein the processor circuit is configured to use a matrix transformation to project locations of the intravascular data from the 2D images to the x-ray angiography-based 3D model to co-register the intravascular data to the x-ray angiography-based 3D model.

4. The system of claim 3, wherein the processor circuit is configured to use an angle at which the plurality of x-ray fluoroscopy images were obtained to project the locations of the intravascular data from the 2D images to the x-ray angiography-based 3D model with the matrix transformation.

5. The system of claim 1, wherein the processor circuit is configured to:
receive CT imaging data from a CT imaging device in communication with the processor circuit; and
generate the CT-based 3D model of the vessel based on the CT imaging data.

6. The system of claim 5, further comprising:
a CT imaging device.

7. The system of claim 1, wherein the processor circuit is configured to:
receive x-ray angiography data from a x-ray angiography device in communication with the processor circuit, wherein the x-ray angiography data comprises a first x-ray angiography image of the blood vessel and the second x-ray angiography image of the blood vessel, wherein the first x-ray angiography image and the second x-ray angiography image are obtained at different angles; and
generate the x-ray angiography-based 3D model based on the x-ray angiography data.

8. The system of claim 7, further comprising:
the x-ray angiography device.

9. The system of claim 1, wherein the processor circuit is configured to output, to the display, a visualization of the intravascular data associated with a location of the visual representation along the blood vessel in the roadmap.

10. The system of claim 1, wherein the intravascular data comprises at least one of pressure data, flow data, or imaging data.

11. The system of claim 1, further comprising:
the intravascular catheter or guidewire.

12. The system of claim 1, further comprising:
the x-ray fluoroscopy device.

13. A co-registration system, comprising:
a processor circuit configured for communication with a display and an x-ray angiography device, wherein the processor circuit is configured to:
  determine a mapping between corresponding locations of a computed tomography (CT)-based three-dimensional (3D) model of a blood vessel and a x-ray angiography-based 3D model of the blood vessel;
  receive, from the x-ray angiography device, a first x-ray angiography image of the blood vessel;
  determine a metric representative of the blood vessel based on the first x-ray angiography image;
  co-register the metric to the x-ray angiography-based 3D model based on the first x-ray angiography image;
  co-register the metric to the CT-based 3D model based on the mapping such that the metric is indirectly co-registered to the CT-based 3D model using the x-ray angiography-based 3D model; and
  output, to the display, the CT-based 3D model and a visual representation of the metric overlaid on the CT-based 3D model.

14. The system of claim 13, wherein the processor circuit is configured to associate same anatomical features of the blood vessel in the CT-based 3D model and the x-ray angiography-based 3D model to determine the mapping.

15. The system of claim 13,
wherein the first x-ray angiography image comprises a two-dimensional (2D) image,
wherein the processor circuit is configured to use a matrix transformation to project a location of the metric from the 2D image to the x-ray angiography-based 3D model to co-register the metric to the x-ray angiography-based 3D model.

16. The system of claim 15, wherein the processor circuit is configured to use an angle at which the first x-ray angiography image was obtained to project the location of the metric from the 2D image to the x-ray angiography-based 3D model with the matrix transformation.

17. The system of claim 13, wherein the processor circuit is configured to:
  receive CT imaging data from a CT imaging device in communication with the processor circuit; and
  generate the CT-based 3D model of the vessel based on the CT imaging data.

18. The system of claim 17, further comprising:
a CT imaging device.

19. The system of claim 13, wherein the processor circuit is configured to:
  receive x-ray angiography data from the x-ray angiography device in communication with the processor circuit, wherein the x-ray angiography data comprises a second x-ray angiography image of the blood vessel and a third x-ray angiography image of the blood vessel, wherein the second x-ray angiography image and the third x-ray angiography image are obtained at different angles; and
  generate the x-ray angiography-based 3D model based on the x-ray angiography data.

20. The system of claim 19, further comprising:
the x-ray angiography device.

* * * * *